United States Patent
Tenev et al.

(10) Patent No.: US 6,377,259 B2
(45) Date of Patent: *Apr. 23, 2002

(54) PRESENTING NODE-LINK STRUCTURES WITH MODIFICATION

(75) Inventors: Tichomir G. Tenev, San Jose; Ramana B. Rao, San Francisco; John O. Lamping, Los Altos, all of CA (US)

(73) Assignee: Inxight Software, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,528

(22) Filed: Jul. 29, 1998

(51) Int. Cl.[7] .......................... G06T 11/20; G06F 15/00; G06F 17/00

(52) U.S. Cl. ....................... 345/440; 707/526

(58) Field of Search ................................. 345/428, 629, 345/440, 473, 474, 475; 707/102, 526, 530

(56) References Cited

U.S. PATENT DOCUMENTS

| | | | |
|---|---|---|---|
| 5,072,412 A | 12/1991 | Henderson, Jr. et al. | 395/159 |
| 5,337,404 A | 8/1994 | Baudelaire et al. | 395/141 |
| 5,515,487 A | 5/1996 | Beaudet et al. | 395/140 |
| 5,590,250 A | 12/1996 | Lamping et al. | 395/127 |
| 5,619,632 A | 4/1997 | Lamping et al. | 395/141 |
| 5,692,117 A | * 11/1997 | Berend et al. | 345/475 |
| 5,880,743 A | * 3/1999 | Moran et al. | 345/475 |
| 6,108,698 A | 8/2000 | Tenev et al. | 709/220 |
| 6,151,033 A | * 11/2000 | Mihara et al. | 345/475 |

FOREIGN PATENT DOCUMENTS

| | | |
|---|---|---|
| EP | 0 702 330 A2 | 3/1996 |
| EP | 0 825 559 A2 | 2/1998 |
| EP | 0 977 131 A2 | 2/2000 |
| EP | 0 977 153 A2 | 2/2000 |
| EP | 0 977 155 A2 | 2/2000 |

OTHER PUBLICATIONS

Manojit Sarkar *Graphical Fisheye Views of Graphs* 1992 ACM CHI '92 May 2–7, 1992, pp. 83–91.
Beckett, J., "Computer Whiz Burns to Learn, Ramana Rao wields technology smarts at Xerox startup," *San Francisco Chronicle*, Jun. 4, 1998.

(List continued on next page.)

*Primary Examiner*—William A. Cuchlinski, Jr.
*Assistant Examiner*—Thu Nguyen
(74) *Attorney, Agent, or Firm*—Mark A. Haynes; Haynes Beffel & Wolfeld LLP

(57) ABSTRACT

A sequence of steps presents node-link representations on a display. The sequence includes a first step, a last step, and at least one intermediate step. The first step presents a first representation that represents a first node-link structure. The last step presents a last representation that represents a second node-link structure that is a modified version of the first node-link structure. Both node-link structures include a set of shared elements that include a moving element. The moving element is represented by features that have different positions in the first and last representations. Each intermediate step presents an intermediate representation that includes features representing a subset of the shared elements including the moving element, and each element in the subset is also represented by features in the first and last representations. The feature representing the moving element has object constancy through the sequence of steps. The modification can include both deletion and insertion, and the sequence can include a first subsequence in which features are deleted and a second subsequence in which features are inserted. Moving elements can follow paths that are not parallel straight lines. Separate changes can be concurrently animated.

20 Claims, 10 Drawing Sheets

OTHER PUBLICATIONS

Beier, T., and Neely, S., "Feature–Based Image Metamorphosis," *SIGGRAPH '92 Computer Graphics Proceedings*, vol. 26, No. 2, Chicago, Jul. 1992, pp. 35–42.

Fairchild, K.M., Poltrock, S.E., and Furnas, G.W., "SemNet: Three–Dimensional Graphic Representations of Large Knowledge Bases," in Guindon, R. Ed., *Cognitive Science and its Application for Human Computer Interaction*, Lawrence Erlbaum, Hillsdale, N.J., 1988, pp. 201–233.

Koike, H., and Yoshihara, H., "Fractal Approaches for Visualizing Huge Hierarchies," *Proceedings of 1993 IEEE/CS Symposium on Visual Languages*, Aug. 24–27, 1993, pp. 55–60.

Lamping, J. and Rao, R., "The Hyperbolic Browser: A Focus+Context Technique for Visualizing Large Hierarchies," Sep. 5, 1995.

Matsuura, T., Taniguchi, K., Masuda, S., and Nakamura, T., "A Graph Editor for Large Trees with Browsing and Zooming Capabilities," *Systems and Computers in Japan*, vol. 24, No. 8, 1993, pp. 35–46.

Munzner, T., Burchard, P., and Chi, E.H., "Visualization through the World Wide Web with Geomview, Cyberview, W3Kit, and WebOOGL," a single page hardcopied from the Web site designated by the URL http://www.ncsa.uiuc.edu/SDG/IT94/Proceedings/VR/munzner/munzner–abstract.html. Hardcopy of changes file from the Web site designated by the URL http://www.geom.umn.edu/software/download/geomview.html, bearing date Oct. 21, 1994.

Munzner, T., and Burchard, P., "Visualizing the Structure of the World Wide Web in 3D Hyperbolic Space," hardcopied from Web site URL http://www.geom.umn.edu:80/docs/research/webviz/ and following sequence of nodes, dated Nov. 21, 1995, also published in Proceedings of VRML. '95, (San Diego, CA, Dec. 14–15, 1995), special issue of Computer Graphics, ACM SIGGRAPH, New York, 1995, pp. 33–38 & 138.

Walsh, J., "Web site development, InXight interface adds animation to site maps," *InfoWorld*, May 18, 1998.

Microsoft organization chart (version 2.0, Oct. 16, 1995) help menu.*

* cited by examiner

PRESENTING NODE-LINK STRUCTURES WITH MODIFICATION

FIELD OF THE INVENTION

The invention relates to presenting a node-link structure in which modification occurs.

BACKGROUND AND SUMMARY OF THE INVENTION

Lamping, J. and Rao, R., "The Hyperbolic Browser: A Focus+Context Technique for Visualizing Large Hierarchies", *Journal of Visual Languages and Computing*, Vol. 7, 1996, pp. 33–55, disclose techniques for displaying a hierarchy in which components diminish in size as they move outwards and the number of components grows exponentially with increasing radius. The display can be smoothly transformed to change the node at the center or focus. Animated transitions between different views maintain object constancy, helping a user assimilate changes. For quick redisplay, less of a fringe is drawn, lines can be drawn rather than arcs, and text can be dropped during animation. Lamping et al., U.S. Pat. No. 5,619,632, disclose a browser that employs similar techniques for presenting a node-link structure and mention that a browser could be used in editing structures.

Matsuura, T., Taniguchi, K., Masuda, S., and Nakamura, T., "A Graph Editor for Large Trees with Browsing and Zooming Capabilities", *Systems and Computers in Japan*, Vol. 24, No. 8, 1993, pp. 35–46, disclose a library program which allows direct manipulation of a large tree on a display. When a node or subtree is added or deleted, the data structure is updated; the layout for each node is calculated based on the graph layout algorithm, and each node and edge is redrawn. When nodes are added or deleted consecutively, a single update of the display can be performed after all the modifications have been made. A viewport includes a global view and a canvas, and updating depends on mode, which may be automatic update, partial update, or on demand update. Partial update resembles on demand update, but an intermediate display node is displayed temporarily.

Beaudet et al., U.S. Pat. No. 5,515,487, disclose selective display of portions of graphics by expanding and collapsing nodes in trees, directed acyclic graphs, and cyclic graphs. Nodes are selected for modification, all nodes connected to each selected node is assigned to a first set of nodes, and then each node is removed from the first set of nodes and assigned to a second set, together with any connected nodes that are not in the first set. The identified nodes are deleted from the display, and each node connected to a deleted node is highlighted, surrounded by an outline box, shown with outgoing arcs, or otherwise shown in a way that distinguishes collapsed nodes.

Windows NT Explorer is a program that can be used to see the hierarchy of folders on a disk drive. The hierarchy is presented as a list of items, with indentation showing which items are children of other items. Some folders are presented with plus signs (+), and if the user does a mouse click on a plus sign, more folders will be displayed. Windows NT also provides a similar program that can be used to see a hierarchy of network resources.

The invention addresses problems in presenting node-link structures that change.

A node-link structure can change in several situations. For example, if the structure is large, the data available at a given time may only define part of the structure. This may occur because data defining the complete structure has not yet arrived or because the structure is so large that memory is not large enough to hold a complete definition of it. In such cases, a partial structure is held in memory, to be changed as additional data arrives or is retrieved.

Another situation in which a node-link structure changes is when the structure is a partial version of an underlying structure. For example, the user may request that specified types of nodes or links be selected to obtain a filtered version. In response, a node-link structure is produced that omits nodes and links that are not selected by the filter criterion, allowing more space for nodes and links of interest. Or the structure can be a tree that represents an underlying directed graph (DG) structure in which there are multiple in-links to a node in the DG that in turn has children. In one approach, the DG node is represented by multiple parent nodes in the tree, each with one of the in-links, but the DG node's children are represented with only one of the parent nodes in the tree. In response to user input, the parent node with which the children are represented can change, thus changing the tree structure (but not the DG).

Also, the underlying structure may itself change. For example, it may be modified in response to processes other than the browser through which it is being viewed. Or it may be modified in response to user requests through the browser interface.

A node-link structure that changes in any of these ways is referred to herein as a "dynamic node-link structure". This term therefore includes not only underlying node-link structures that change, but also partial versions that change or are obtained differently from an underlying node-link structure, which may itself be either static or dynamic.

The presentation techniques described by Lamping and Rao and other conventional techniques can lead to problems with structure change during presentation. Typically, a new layout must be done for at least part of the changed structure and then it must be redisplayed. Therefore, when a change occurs in a structure being presented with such techniques, there is often an abrupt or discontinuous transition to a representation of the changed structure. In some cases, layout and redisplay is so slow that a user cannot effectively interact with the changed structure. Further, layout and redisplay do not provide a way to animate the transition from the old to the new structure, which would improve the user's understanding of the transition. Therefore, many conventional presentation techniques only produce satisfactory results for static node-link structures, and are not suitable for dynamic node-link structures.

Some conventional presentation techniques can, however, animate transitions to expand or contract an item on a hierarchical list. These techniques are limited however to one modification, either an expansion or a contraction, and therefore are difficult to generalize to all transitions.

The invention alleviates problems in presenting dynamic node-link structures by providing techniques that make it easier for a user to understand a broader range of transitions. Each technique presents a sequence of representations, the first of which represents a first node-link structure and the last of which represents a second node-link structure that is a modified version of the first node-link structure. The elements shared by the first and last structures include a moving element represented by features that have different positions in the first and last representations. Between the first representation and the last representation, the techniques present at least one intermediate representation. Each representation in the sequence includes features representing a subset of the shared elements that includes the moving element. The feature representing the moving element has object constancy through the sequence of steps.

In one aspect of the invention, the second node-link structure is a modified version with at least one insertion and at least one deletion in the first node-link structure. For example, an element could be deleted from one position and inserted at another position. Therefore, techniques according to this aspect, referred to as "deletion and insertion" herein, could be used to move an element or to make more complicated changes, in cluding multiple deletions and insertions.

Each of the new deletion and insertion t techniques presents a sequence of images in which the area of an element being deleted or inserted changes, either decreasing or increasing in each successive image. At the same time, compensating area changes occur in nearby elements. If the area changes are appropriately chosen, the sequence of images will produce the impression that, in deletion, nearby elements are closing in on the element being deleted and, in insertion, that the element being inserted is pushing nearby elements aside.

The sequence of images can also, in each case, provide an appropriate motion of an element being deleted or inserted. For example, in deletion of an element with a wedge-shaped area, the element being deleted can move out the open end of its wedge, can shrink along with its wedge, or can disappear before its wedge begins to shrink.

Yet other deletion and insertion techniques animate expansion or contraction of the descendants of a node. In expansion of a node's descendants, the descendants can spread from the node; in contraction, the descendants can be d drawn into the node.

The deletion and insertion techniques can be implemented with a first subsequence of steps in which features representing elements are deleted and a second subsequence in which features representing elements are inserted. For example, to show an element in a new position, it can first be deleted at its previous position and then inserted at the new position.

Another aspect of the invention is based on the discovery of techniques for animating a transition in a two-dimensional display. According to these techniques, two moving elements follow paths that are not parallel straight lines. For example, the elements may be moving along curved paths, or the elements may be moving along independent non-parallel paths.

Yet another aspect of the invention is based on the discovery of techniques for concurrently animating separate changes in a node-link structure. According to these techniques, signals are received requesting at least two separate changes, and change data indicating the requested changes are obtained based on the signals. Then, the change data and a first data structure defining the node-link structure are used to obtain a second data structure defining a changed version of the node-link structure, and then representations can accordingly be presented.

The new techniques are advantageous because they make it easy for the user to understand a transition in a dynamic node-link structure. In addition, the new techniques can be implemented without the time-consuming computation necessary to perform layout and redisplay of a complete node-link structure instead, incremental layout and redisplay can be employed. As a result, a user is able to interact more effectively with a dynamic node-link structure.

The following description, the drawings, and the claims further set forth these and other aspects, objects, features, and advantages of the invention.

DETAILED DESCRIPTION OF THE INVENTION

A. Conceptual Framework

Figure 1:
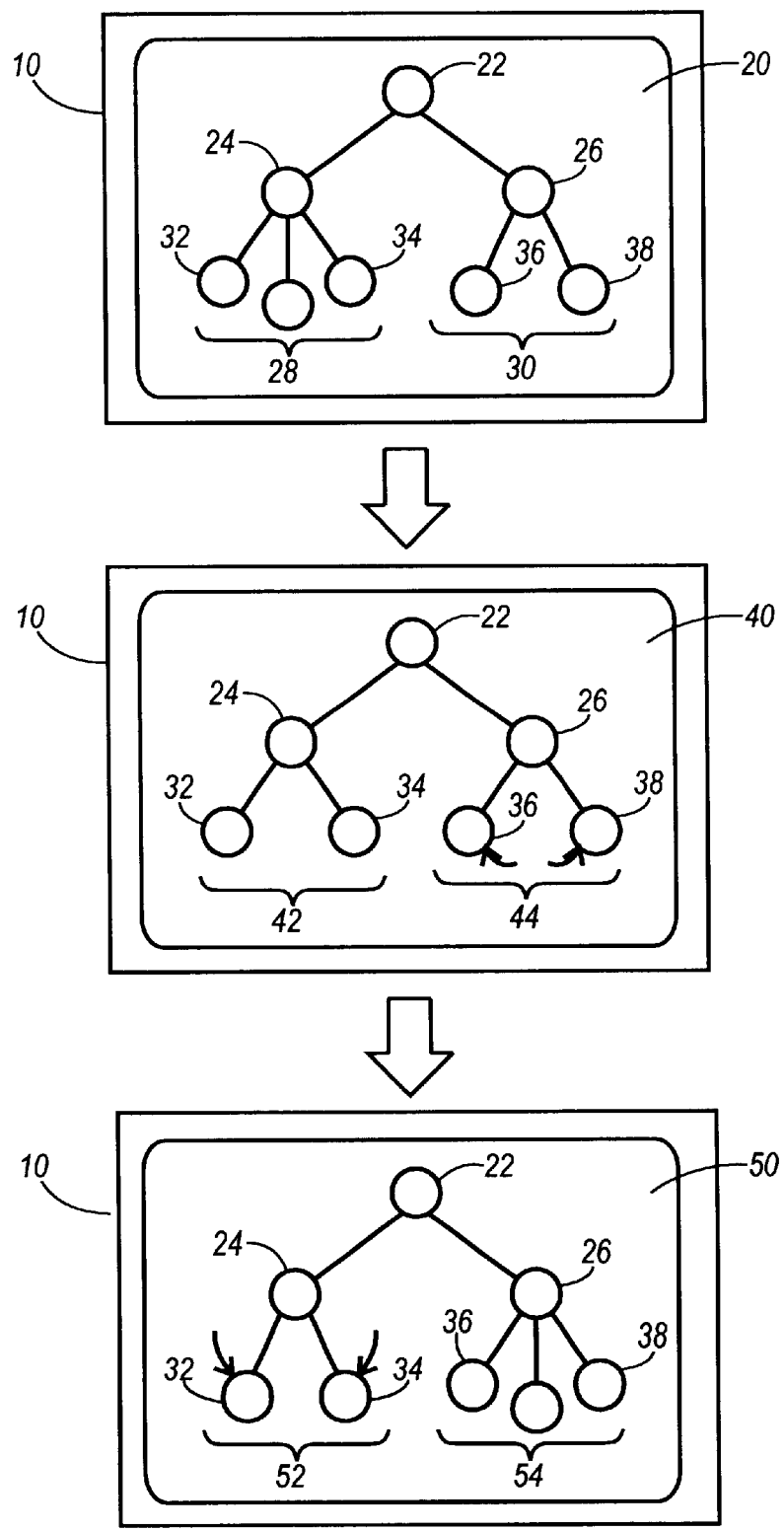
FIG. 1 is a schematic flow diagram showing a sequence of node-link representations with modifications.

The following conceptual framework, when taken with the conceptual frameworks set forth in U.S. Pat. Nos. 5,590,250 and 5,619,632, incorporated herein by reference, is helpful in understanding the broad scope of the invention, and the terms defined below have the indicated meanings throughout this application, including the claims.

A "node-link structure" is a structure that includes items that can be distinguished into nodes and links, with each link relating two or more of the nodes. A "graph" is a node-link structure in which each link relates two nodes. A "directed graph" is a graph in which each link indicates direction between the nodes it relates, with one node being a source or "from-node" of the link and the other being a destination or "to-node" of the link. An "acyclic directed graph" is a directed graph in which the links, when followed in their indicated directions, do not provide a path from any node back to itself. A "tree" is an acyclic directed graph with exactly one root node such that, for any non-root node in the tree, the links, when followed in their indicated directions, provide only one path that begins at the root node and leads to t he non-root node.

The "elements" of a node-link structure are its nodes and links.

An "image" is a pattern of physical light. An "image output device" is a device that can provide output defining an image. A "display" is an image output device that provides information in visible form. A display may, for example, include a cathode ray tube; an array of light emitting, reflecting, or absorbing elements; a scanning light source; a structure that presents marks on paper or a another medium; or any other structure capable of defining an image in a visible form.

A "node-link representation" is a representation of a node-link structure. For example, links can be represented by link features and nodes can be represented by node features.

A feature representing an element "has an area" if the feature has spatial extent in each dimension of the display on which it is presented; for example, on a two-dimensional display, the feature has an area if it extends in both dimensions of the display.

The "nearby features" of a feature representing an element in a node-link representation include features that represent other elements and which are closer to the feature than the median distance between the feature and other features that represent other elements.

A feature representing an element of a node-link structure "has object constancy" through a sequence of representations of the node-link structure, if the features representing the element in the representation in the sequence all appear to be the same feature. For example, the features in any two successive representations in the sequence may be sufficiently similar and sufficiently close in time and space that they appear to be the same feature. A feature with object constancy that appears to move "follows a path".

An "animation loop" is a repeated operation in which each repetition presents an image and in which features in each image appear to be continuations of features in the next preceding image, such as through object constancy. An "animation cycle" is a single iteration of an animation loop.

An element "has descendants" or "is expanded" in a node-link representation if the element has at least one child in the representation. An element "has no descendants" if the element has no children in the representation. An element "is contracted" if the element has no descendants in the representation even though it could based on the underlying node-link structure.

The term "navigation signal" is used herein to mean a signal that indicates that the user has greater interest in a part of a node-link structure than in other parts. For example, an "expand signal" indicates a request to present a representation of a graph in which the representation of an element of the graph is expanded, while a "contract signal" indicates a request to present a representation of a graph in which the representation of an element of the graph is contracted. Other examples include requests to present a part of the node-link structure at a specific position, which can be done by selecting a bookmark or the like or by a point and click operation requesting that a feature pointed to be moved to a center of focus.

A signal "requests a change" in a node-link structure if the signal requests a change in one or more elements of the structure, such as an insertion or deletion of one or more elements or an operation such as moving or copying that can be implemented by a combination of insertions and deletions. Expand and contract signals are examples of signals that request a change.

Two changes are "separate" if each change could be made independently of the other.

A "processor" is a component of circuitry that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations.

A "network" is a combination of circuitry through which a connection for transfer of data can be established between machines.

B. General Features

FIGS. 1–4 show general features of the invention.

In FIG. 1, display 10 presents a sequence of node-link representations beginning with first representation 20 of a first node-link structure and ending with last representation 50 of a second node-link structure that is a modified version of the first node-link structure with both a deletion and an insertion, which could result from signals requesting two separate changes. Between representations 20 and 50, display 10 presents intermediate representation 40.

The first node-link structure has a first level node represented by feature 22, and the first level node has two children that are second level nodes represented by features 24 and 26. The child represented by feature 24 is at the top of branch 28, which includes all its descendants, including three children that are third level nodes. Similarly, the child represented by feature 26 is at the top of branch 30, which includes all its descendants, including two children that are third level nodes.

The second node-link structure, shown by last representation 50, shares a number of elements with the first node-link structure, a subset of which are represented by features in all of representations 20, 40, and 50. The shared elements include the nodes represented by features 22, 24, and 26 and the links that connect them, each of which has a stable position through representations 20, 40, and 50. The shared elements also include nodes represented by features 32 and 34 in branch 28 and nodes represented by features 36 and 38 in branch 30 and the features representing links to nodes 32, 34, 36, and 38; each feature that represents one of these nodes and links has a different position in last representation 50 than in first representation 20, and these nodes and links are therefore referred to herein as "moving elements".

In the example illustrated in FIG. 1, the changes in positions of features re presenting moving elements occur because the first node-link structure is modified in two ways to obtain the second node-link structure, One of the third level nodes represented in branch 28 is deleted to obtain branch 52, and an additional third level node is added to branch 30 to obtain branch 54. Despite the modifications between the first and second node-link structures and the resulting changes of position, the features representing the moving elements have object constancy through the sequence of representations. As suggested by the arrows in representations 40 and 50, nodes 36 and 38 appear to follow curved paths apart, while nodes 32 and 34 appear to follow curved paths toward each other. The nodes thus appear to follow paths that are not parallel straight lines.

Object constancy through the sequence could be produced in various ways, but the technique illustrated in FIG. 1 exemplifies the production of object constancy by presenting similar features at small intervals in space and time. Each of features 22, 24, and 26 and the features representing links between them can remain substantially identical while presented in rapid succession at the same position, ensuring object constancy. Each of features 32, 34, 36, and 38 and the features representing links to them can also remain substantially identical while presented in rapid succession at slightly displaced positions. The displacements in position of features 32 and 34 bring them closer together to compensate for deletion of a third level node that is a child of feature 24; features 32 and 34 are illustratively closer together in branch 52, in which the node has been deleted, than in branch 28 prior to deletion and in branch 42 in which the deletion is first made. The displacements of features 36 and 38 move them apart to compensate for insertion of a third level node that is a child of feature 26; features 36 and 38 are farther apart in branch 44 than in branch 30, and the node has been inserted in branch 54.

Figure 2:
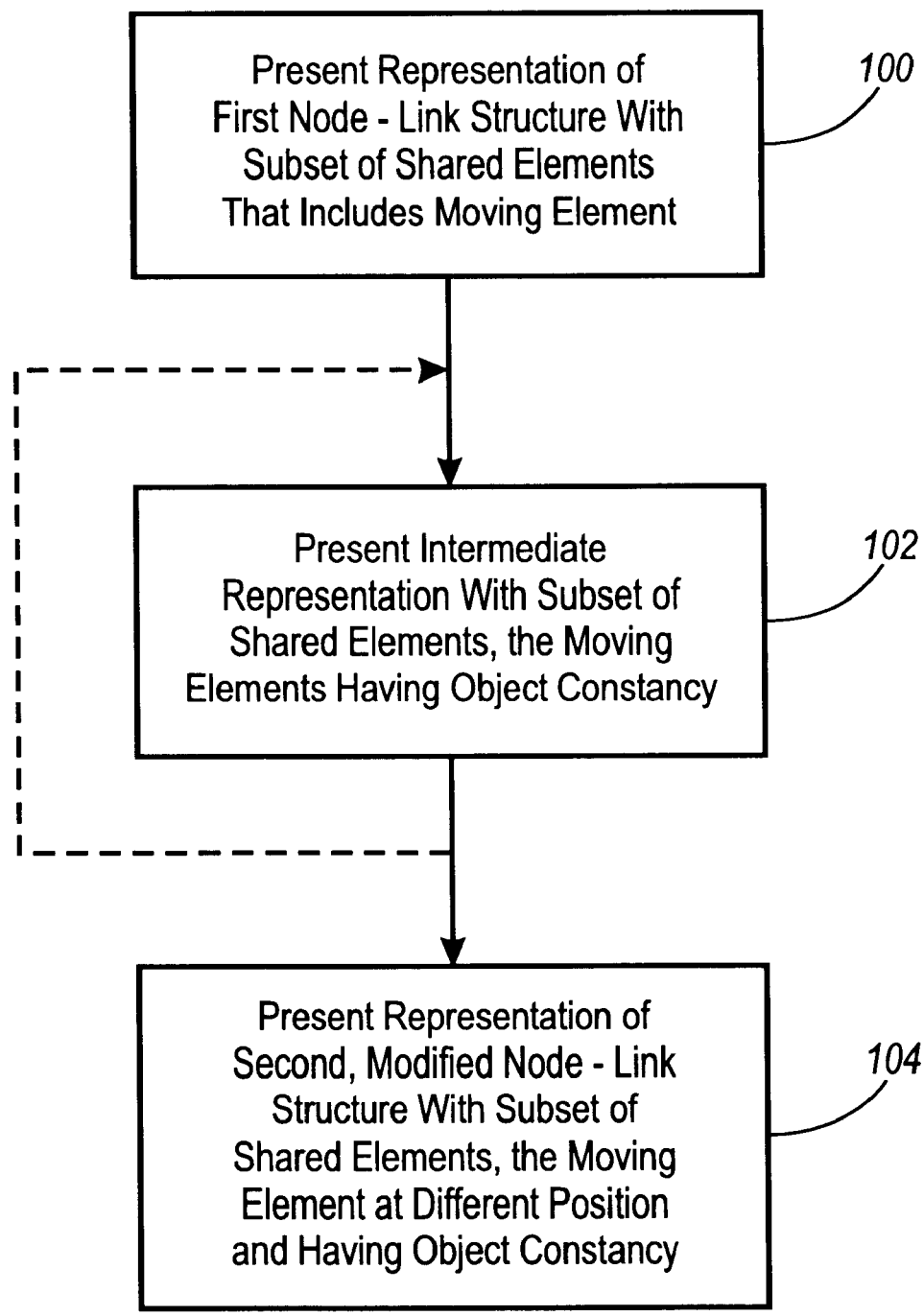
FIG. 2 is a flow chart showing general acts in presentation a sequence of representations like the one in FIG. 1.

In FIG. 2, the act in box 100 begins by presenting a first representation. The first representation represents a first node-link structure and includes features representing a subset of the elements that are shared with a second node-link structure. The subset includes a moving element, such as a node represented by one of features 32, 34, 36, and 38 in FIG. 1.

The act in box 102 then presents an intermediate representation that also includes features representing the subset of shared elements. As illustrated by the dashed line, the act in box 102 may be performed more than once to present a series of two or more intermediate representations. In each intermediate representation, each feature representing the moving element has object constancy with the feature representing the moving element in the preceding representation, which may be the first representation or a preceding intermediate representation.

Finally, the act in box 104 presents a last representation, representing the second node-link structure, which is a modified version of the first node-link structure. As in box 102, the last representation includes features representing the subset of shared elements, and the feature representing the moving element has object constancy with the feature representing the moving element in the preceding intermediate representation, despite the change in position from the first representation to the last representation.

Figure 3:
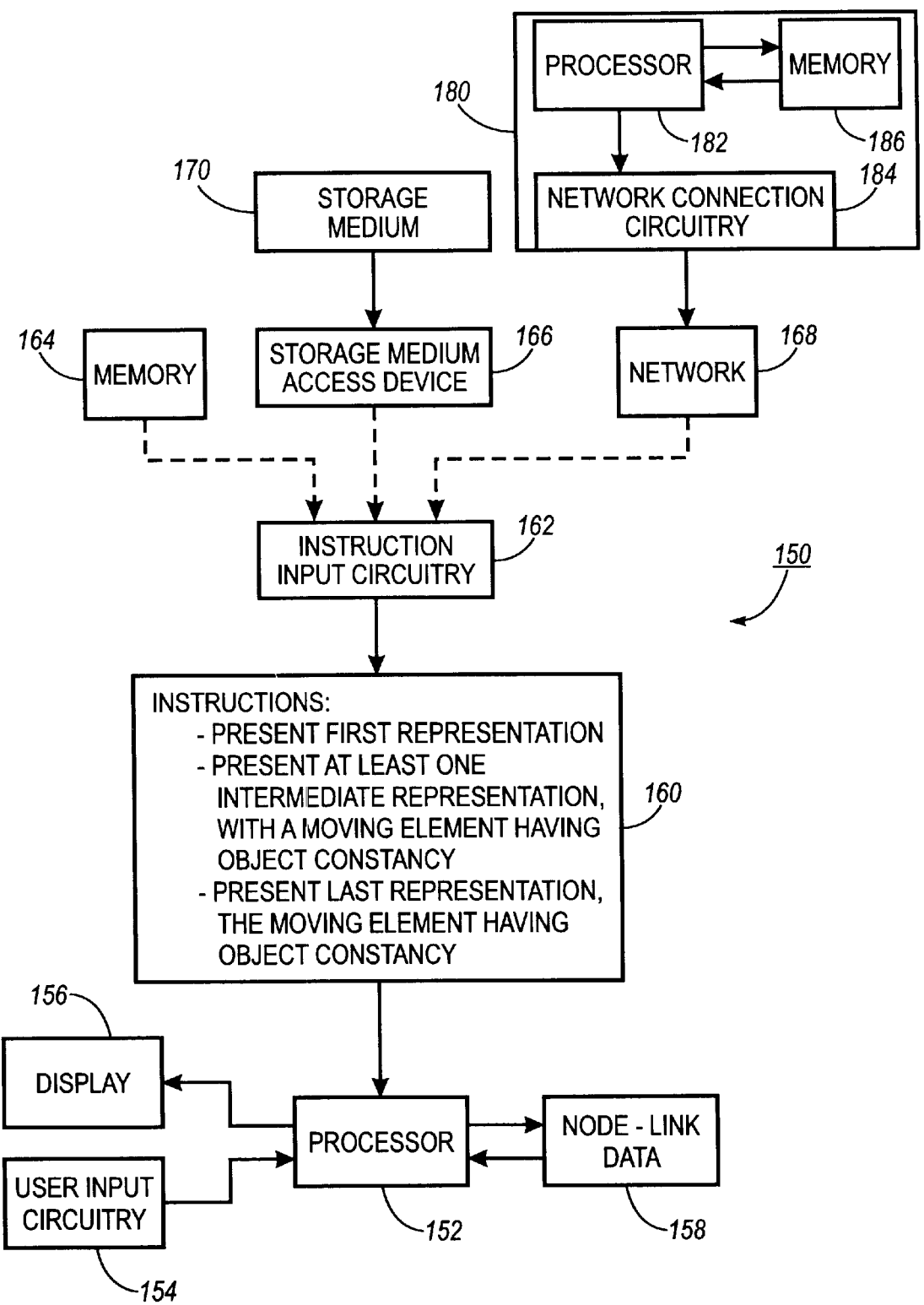
FIG. 3 is a schematic diagram showing general components of a machine that presents a sequence of representations like the one in FIG. 1.

Machine 150 in FIG. 3 includes processor 152 connected for receiving data indicating user signals from user input circuitry 154 and for providing data defining images to display 156. Processor 152 is also connected for accessing node-link data 158, which define first and second node-link structures, the second being a modified version of the first. Processor 152 is also connected for receiving instruction data 160 indicating instructions through instruction input circuitry 162, which can illustratively provide instructions received from connections to memory 164, storage medium access device 166, or network 168.

In executing the instructions indicated by instruction data 160, processor 152 causes display 156 to present a first representation of the first node-link structure, including features representing a subset of the elements that are shared with the second node-link structure. The subset of shared elements includes a moving element as described above. Then processor 152 causes display 156 to present at least one intermediate representation, each also including features representing the subset of shared elements; the feature representing the moving element has object constancy with the feature representing the same shared element in the preceding representation. Finally, processor 152 causes display 156 to present a last representation of the second node-link structure, also including features representing the subset of shared elements, and the feature representing the moving element has object constancy with the feature representing the moving element in the preceding intermediate representation.

As noted above, FIG. 3 illustrates three possible sources from which instruction input circuitry 162 could receive data indicating instructions-memory 164, storage medium access device 166, and network 168.

Memory 164 could be any conventional memory within machine 150, including random access memory (RAM) or read-only memory (ROM), or could be a peripheral or remote memory device of any kind.

Storage medium access device 166 could be a drive or other appropriate device or circuitry for accessing storage medium 170, which could, for example, be a magnetic medium such as a set of one or more tapes, diskettes, or floppy disks; an optical medium such as a set of one or more CD-ROMs; or any other appropriate medium for storing data. Storage medium 170 could be a part of machine 150, a part of a server or other peripheral or remote memory device, or a software product. In each of these cases, storage medium 170 is an article of manufacture that can be used in machine 150. Data units can be positioned on storage medium 170 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 180. Processor 182 in machine 180 can establish a connection with processor 152 over network 168 through network connection circuitry 184 and instruction input circuitry 162. Either processor could initiate the connection, and the connection could be established by any appropriate protocol. Then processor 182 can access instruction data stored in memory 186 and transfer the instruction data over network 168 to processor 152 so that processor 152 can receive instruction data 160 from network 168. Instruction data 160 can then be stored in memory 164 or elsewhere by processor 152, and can be executed.

Figure 4:
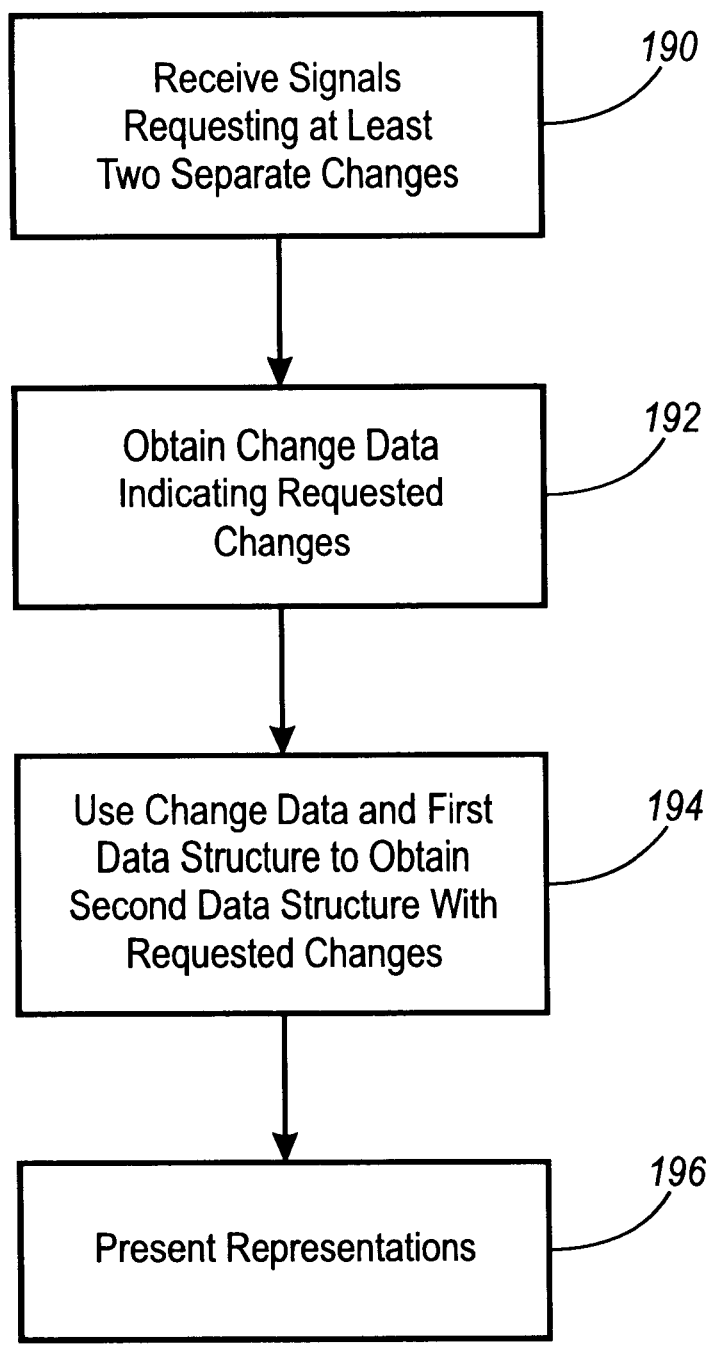
FIG. 4 is a flow chart showing general acts in preparing to present a sequence of representations like the one in FIG. 1 based on signals requesting separate changes.

FIG. 4 illustrates how separate changes can be handled concurrently.

The act in box 190 receives signals requesting at least two separate changes in a first node-link structure. For example, the signals could include two different signals requesting separate changes.

Based on the signals, the act in box 192 obtains change data indicating the changes requested by the signals. The change data could also be stored in an appropriate data structure pending use.

Then, the act in box 194 uses the change data and a first data structure defining the first node-link structure to obtain a second data structure defining a second node-link structure. The second node-link structure is a version of the first in which the requested changes have been performed.

Finally, the act in box 196 presents representations of the first and second node-link structures, with animation. This act can include the acts described above in relation to FIG. 2.

C. Implementation

The general features described above could be implemented in numerous ways on various machines to present node-link representations. An implementation described below has been implemented on a PC-based system running the 32 bit versions of Microsoft Windows and executing code compiled from C++ language source code.

C.1. System

Figure 5:
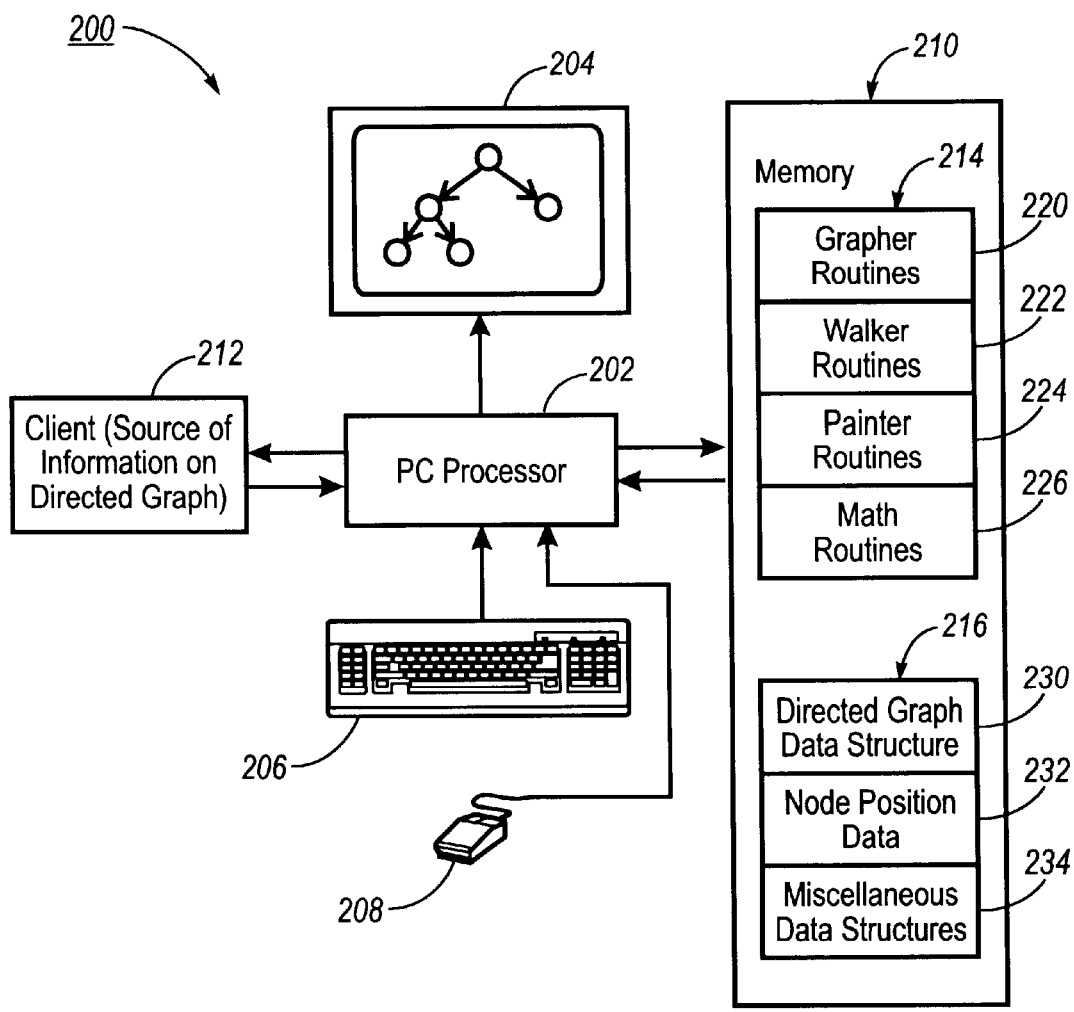
FIG. 5 is a schematic diagram of a system.

In FIG. 5, system 200 includes PC processor 202, which is connected to display 204 for presenting images and to keyboard 206 and mouse 208 for providing signals from a user. PC processor 202 is also connected so that it can access memory 210 and client 212. Memory 210 can illustratively include program memory 214 and data memory 216. Client 212 is a source of information about a directed graph, which could be a combination of routines and data stored in memory 210 or could be independent of memory 210 as shown. For example, processor 202 could communicate with client 212 through a network.

The routines stored in program memory 214 can be grouped into several functions. Grapher routines 220 create and modify a data structure representing the directed graph defined by the information from client 212. Walker routines 222 respond to navigation signals and other user signals from keyboard 206 and mouse 208 by obtaining information from the directed graph data structure. Painter routines 224 provide signals to display 204 to cause it to present representations of the directed graph data structure. Math routines 226 can be called to obtain positions of elements of the directed graph in a layout space.

Data memory 216 in turn contains data structures accessed by processor 202 during execution of routines in program memory 214. Directed graph data structure 230, as noted above, can be created and modified by grapher routines 220 and can also be accessed by walker routines 222 and painter routines 224.

Further details about the implementation of directed graph data structure 230 are set forth in copending coassigned U.S. patent application Ser. No. 09/124,974, entitled "Controlling Which Part of Data Defining a Node-Link Structure is in Memory", and U.S. patent application Ser. No. 09/124,338 entitled "Node-Link Data Defining a Graph and a Tree Within the Graph" U.S. Pat. No. 6,108,698, both incorporated herein by reference.

Node position data 232, which can be linked to or included within directed graph data structure 230, can include positions of nodes in a negatively curved space such as a hyperbolic plane and in a rendering space such as a two-dimensional unit disk. Node position data 232 can be accessed by routines in program memory 214.

The routines in program memory 214 can also access various miscellaneous data structures 234. Data structures 234 may, for example, include an extra data structure for mapping from a pair of node IDs to a link ID, implemented as a standard heap; this extra data structure allows lookup and insertion of a link ID in constant expected time.

C.2. Responding to Events

Figure 6:
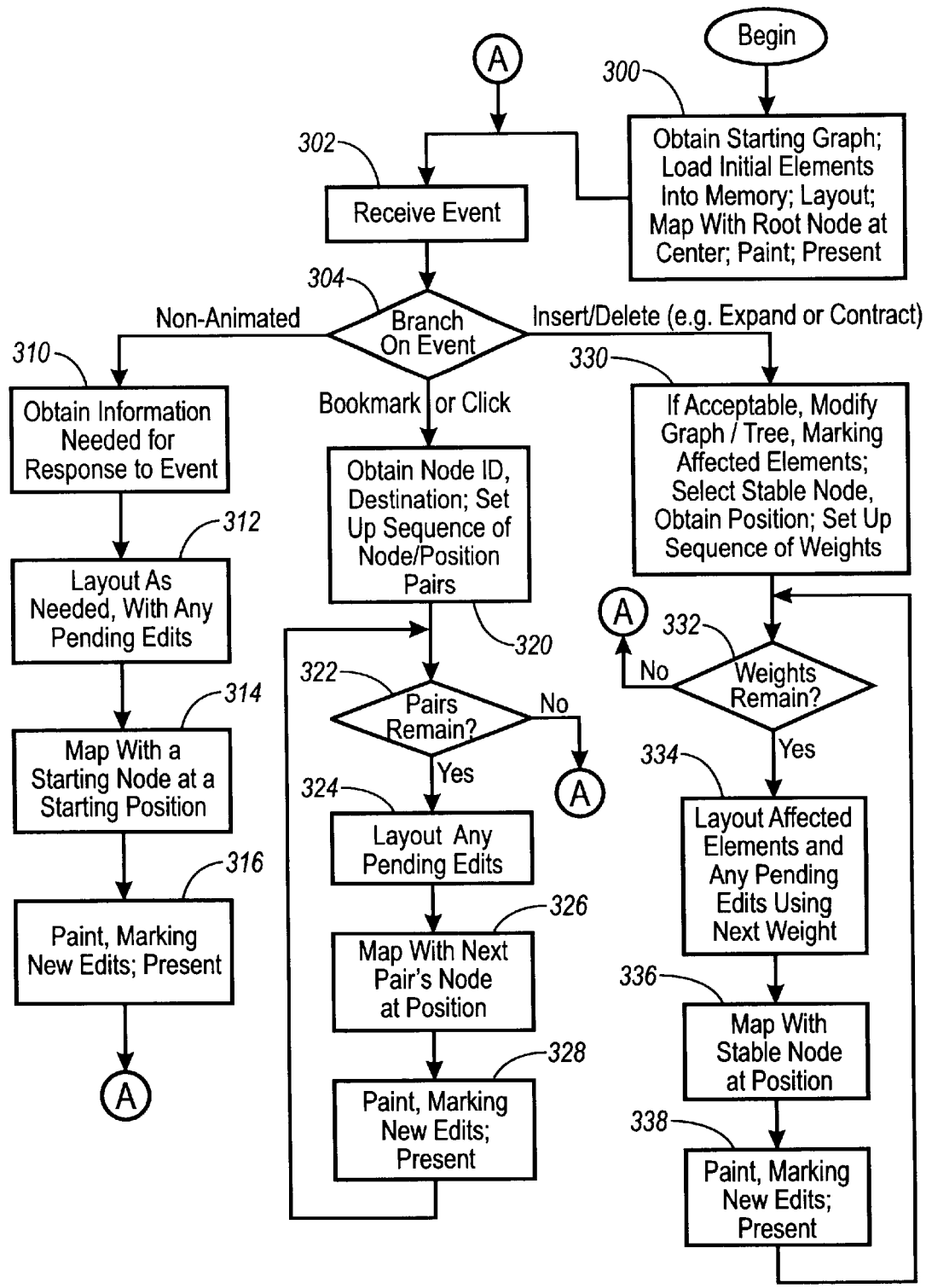
FIG. 6 is a flow chart showing how the system of FIG. 5 can respond to events by presenting representations of a directed graph.

FIG. 6 shows how the system of FIG. 5 can respond to events by presenting representations of a graph.

In box 300, client 212 begins by obtaining a starting graph and by loading an initial set of elements into memory, such as through calls to create nodes as described in copending coassigned U.S. patent application Ser. No. 09/124,474, entitled "Controlling Which Part of Data Defining a Node-Link Structure is in Memory", incorporated herein by reference. Expansion flags define a tree within the initial set of elements, as described in copending coassigned U.S. patent application Ser. No. 09/124,338, entitled "Node-Link Data Defining a Graph and a Tree Within the Graph", incorporated herein by reference. Client 212 also makes appropriate calls to routines in memory 214 for layout of the tree in a hyperbolic plane, for mapping the tree from the hyperbolic plane to a unit disk with the root node at the disk center, for painting the mapped tree, and for presentation of the painted version on display 204 by swapping a double buffer, all in box 300.

In box 302, client 212 receives an event relating to the graph. The event could result from a navigation signal, an editing signal, or another type of signal from a user. Alternatively, the event could be received from another source, either within or external to system 200. In either case, the event could take the form of a call from within client 212, from one of the routines in memory 214, or from other instructions executed by processor 202. A series of received events could be held in a queue, so that box 302 could involve popping an event from a queue.

In response to the event received in box 302, client 212 initiates an appropriate response by making one or more calls to routines in memory 214. As indicated by box 304, the response depends on the type of event, so that a branch is taken based on the event.

The event may be a non-animated event, such as an orientation shift event, a stretch event, or a dragging event. An orientation event can result when the user indicates a new orientation for the root node. A stretch event can result when the user indicates a new stretch factor for the displayed representation. A dragging event, for example, can result when the user selects a position within the representation, such as by a mouse down click, and requests that it be moved by an appropriate gesture or other signal.

Client 212 begins the response to a non-animated event in box 310 by obtaining any information needed for responding to the event. For an orientation event, the information obtained in box 310 can include the new orientation. For a stretch event, the information obtained in box 310 can include the new stretch factor.

For a dragging event, obtaining information in box 310 is somewhat more complicated. Client 212 could obtain a node identifier (node ID) of the node nearest the selected position and could also obtain information about the requested motion. These items of information could be obtained in much the same way as illustrated by the function find-nearest-node described at cols. 71–72 and as described in relation to FIG. 14 of U.S. Pat. No. 5,590,250, incorporated herein by reference.

When client 212 has obtained the necessary information in box 310, it can conclude with appropriate calls to walker routines 222 and painter routines 224 for layout, mapping, and painting. For an orientation event, the root node must be laid out at the new orientation. For a stretch event or a dragging event, layout is not needed. For a stretch event, the call to walker routines 222 must, however, include the new stretch factor, for use in mapping. Similarly, for a dragging event, the call to walker routines 222 must include the node ID of the nearest node and the next position along the path of motion, for use in mapping.

In box 312, walker routines 222 could first perform any necessary layouts in the hyperbolic plane, and could also lay out any pending edits of the tree, in the manner described in copending coassigned U.S. patent application Ser. No. 09/124,805, entitled "Local Relative Layout of Node-Link Structures in Space with Negative Curvature", incorporated herein by reference. Then, in box 314, walker routines 222 could map the tree into the unit disk, beginning with a starting node at a starting position, in the manner described in copending coassigned U.S. patent application Ser. No. 09/124,529, entitled "Mapping a Node-Link Structure to a Rendering Space Beginning from any Node", incorporated herein by reference. For example, in response to a dragging event, the starting node could be the nearest node identified in box 310 and the starting position could be the next position along the path of motion. The starting node and starting position previously used for mapping could be used in response to an orientation or stretch event.

When the tree has been mapped, painter routines 224 can be called to paint the mapped tree in a display buffer, in box 316. During painting, painter routines 224 can mark new edits that occur in the tree as a result of node creation as described in copending coassigned U.S. patent application Ser. No. 09/124,338, entitled "Node-Link Data Defining a Graph and a Tree Within the Graph" U.S. Pat. No. 6,108, 689, incorporated herein by reference. Each edit can be marked by setting a flag or storing other appropriate data. When painting is completed, a swap of display buffers can be performed to present the tree as painted, thus providing a representation of the graph.

As noted above, these events are currently implemented as non-animated events. In response to an orientation event, the representation pivots to the new orientation, typically around the node at the focus of the display region. Similarly, in response to a stretch event, the representation expands or contracts radially, typically around the node at the focus. In response to a dragging event, the representation moves at a rate determined by the input signal. Client 212 could, however, provide an animated response to an orientation event, a stretch event, or a dragging event by converting the requested change into an equivalent sequence of smaller events, and issuing a series of calls in box 310, one call for each of the smaller events.

FIG. 6 also illustrates responses to two different types of events which are always treated as animated in the current implementation. The first type is a bookmark or click event, in response to which one node's position is moved during an animated sequence and other elements move to accommodate the one node's movement. The second type is an insert/delete event, in response to which one node remains stable during an animated sequence in which some elements are contracted, others are expanded, and still others move to accommodate the contractions and expansions.

A bookmark or click event could result when the user selects an item in a menu or other collection of bookmarks or selects a position within the representation with a mouse down-up click. In response to an event of this type, client 212 obtains a node ID and a destination position in the unit disk. In the case of a bookmark event, the node ID and destination position are previously stored and can be retrieved from memory. In the case of a click event, client 212 could obtain a node ID of the node nearest the selected position in much the same way as the function find-nearest-node described at cols. 71–72 of U.S. Pat. No. 5,590,250, incorporated herein by reference, and the destination could be a default position, such as the center of the unit disk.

In box 320, client 212 could call walker routines 222 with the node ID and destination position. Walker routines 222 can respond by performing an animation loop to present a sequence of representations in which the node moves from its previous position to the destination position. In box 320, walker routines 222 begin by setting up a sequence of node/position pairs, each including the node ID and a position in the unit disk. The positions can be obtained by obtaining a total translation from the previous position to the destination position, then obtaining and repeatedly composing an nth root of the total translation with a current translation as described in relation to boxes 470, 472, and 482 in FIG. 12 of U.S. Pat. No. 5,619,632, incorporated herein by reference. The number of node/position pairs can be large enough to ensure a smooth animation from the previous position to the destination position, with features representing elements of the structure maintaining object constancy during the animation. As an alternative to the nth root approach, the positions could be obtained by selecting an appropriate number of points along an appropriately chosen arc in the hyperbolic plane from the previous position to the destination position. The arc could be chosen to compromise between a straight line, which can appear unnatural, and the arc the node would have taken in the nth root method, which can require an excessive number of animation steps to appear smooth. The number of points could be chosen to ensure satisfactory animation.

Walker routines 222 then perform an iteration of the animation loop for each node/position pair in the sequence, as indicated in box 322. In box 324, walker routines 222 could first lay out in the hyperbolic plane any pending edits of the tree, as described above in relation to box 312. Then, in box 326, walker routines 222 could map the tree into the unit disk, beginning with the node and position from the next node/position pair as the starting node and the starting position, as described above in relation to box 314.

When the tree has been mapped, painter routines 224 can be called to paint the mapped tree in a display buffer, in box 328. During painting, painter routines 224 can mark new edits that occur in the tree as a result of node creation as described above in relation to box 316. When painting is completed, a swap of display buffers can be performed to present the tree as painted, thus providing a representation of the graph.

When a new edit is marked in box 328 by painter routines 224, the new edit is laid out during the next iteration, in box 324. As a result, the animated sequence of representations, rather than showing a static node-link structure as in U.S. Pat. No. 5,619,632, shows a dynamic node-link structure. The edits, however, serve primarily to add features representing new nodes along the outer perimeter of the representation as the representation makes the transition from the previous position to the destination position. As a result, the added features do not interfere with or reduce the perception of object constancy for features representing other elements.

An insert/delete event could result when the user requests expansion or contraction of a node or requests some other modification of the graph or the tree. An insert/delete event could also be received in the form of a call, and could thus provide a mechanism for automatic modification of the graph or tree without concurrent human control. In addition, an insert/delete event could result from signals requesting two or more separate changes, with data indicating the changes having been obtained pending a call for animation of all of the changes. An insert/delete event could include both deletion and insertion.

In response to an event of this type, client 212 can first make appropriate calls to routines in memory 214 to determine whether the requested modification of the graph or tree is acceptable, in box 330. For example, a technique for determining whether an expand signal is acceptable is described in relation to FIG. 7 of copending coassigned U.S. patent application Ser. No. 09/124,338, entitled "Node-Link Data Defining a Graph and a Tree Within the Graph" U.S. Pat. No. 6,108,698, incorporated herein by reference.

If the requested modification of the graph or tree is acceptable, client 212 can modify the graph or tree accordingly, making calls to routines in memory 214 as necessary. In the process of making the modification, each element that could be inserted, deleted, or changed by the modification, referred to herein as an "affected element", is marked, such as by setting a flag or storing other appropriate data. If a node is selected by an expand signal or a contract signal, its parent is also an affected node, because the area allocated to the parent may change. For most other insert/delete events, only nodes that are inserted or deleted are affected. Client 212 can then select a node as a stable node to be held at its previous position during animated presentation of the modification.

In many cases, the starting node used previously in mapping can be selected as the stable node, and it can be held at the previous starting position. In other cases, it may be desirable for client 212 to select a different stable node; for example, a node that is being expanded could be selected as the stable node, to be held at its current position, which thus becomes the new starting position. Therefore, unless client 212 selects a different stable node, the previous starting node and starting position are usually retained. But where the previous starting node is being deleted, another node must be selected as the default stable node subject to change by client 212.

When a deletion is being made, walker routines 222 can be called with the node IDs of the node being deleted and of its closest ancestor that will remain in the tree being mapped after deletion. This ancestor can be found by walking upward from the node being deleted until an ancestor is reached that is not being deleted by the current insert/delete event.

In response to this call, walker routines 222 can test whether the node being deleted is the previous starting node. If so, the identified ancestor can be selected to replace it as the starting node. If the ancestor has been recently mapped to a position that is displayed and that is available, that position can be selected as the starting position. If the ancestor has not been recently mapped, or was mapped to a position that is not displayed or that is not available because another element has now been mapped there, the starting position can be the center of the unit disk.

Also in box 330, client 212 could call walker routines 222 with the stable node ID and position. Walker routines 222 can respond by performing an animation loop to present a sequence of representations in which, first, deleted nodes are contracted at their previous positions, and then inserted nodes are expanded at their new positions, all while the stable node is held at its previous position. If the stable node cannot be held at its previous position because it was not recently mapped or was mapped to a position that is not displayed or is not available, it can be shifted to that position after deleted nodes are contracted with the previous starting node at the previous starting position, resulting in a sudden movement between contraction and expansion. Walker routines 222 begin by setting up a sequence of weights to govern the rate at which the area allocated to each affected node changes during contraction and expansion. The weights are separated by sufficiently small increments to preserve object constancy during animation.

Walker routines 222 then perform an iteration of the animation loop for each weight in the sequence, as indicated in box 332. In box 334, walker routines 222 could first lay out in the hyperbolic plane the affected nodes and any pending edits of the tree, using the iteration's weight in the manner described in copending coassigned U.S. patent application Ser. No. 09/124,805, entitled "Local Relative Layout of Node-Link Structures in Space with Negative Curvature", incorporated herein by reference. Then, in box 336, walker routines 222 could map the tree into the unit disk, beginning with the stable node and position, as described above in relation to box 314.

When the tree has been mapped, painter routines 224 can be called in box 338 to paint the mapped tree in a display buffer. During painting, painter routines 224 can mark new edits that occur in the tree as a result of node creation as described above in relation to boxes 316 and 328. When painting is completed, a swap of display buffers can be performed to present the tree as painted, thus providing a representation of the graph.

Whether there are pending edits or not, a series of iterations of the animation loop beginning in box 332 produces representations of a dynamic node-link structure because of the deletions and/or insertions. In addition, affected elements move to new positions from their positions prior to the deletions and insertions. The technique has been successfully implemented to produce object constancy during these movements.

After a representation is provided in box 316 or after an animation sequence is completed in box 322 or 332, another event can be received in box 302, as indicated by the circles labeled "A" in FIG. 6.

C.3. Layout

Figure 7:
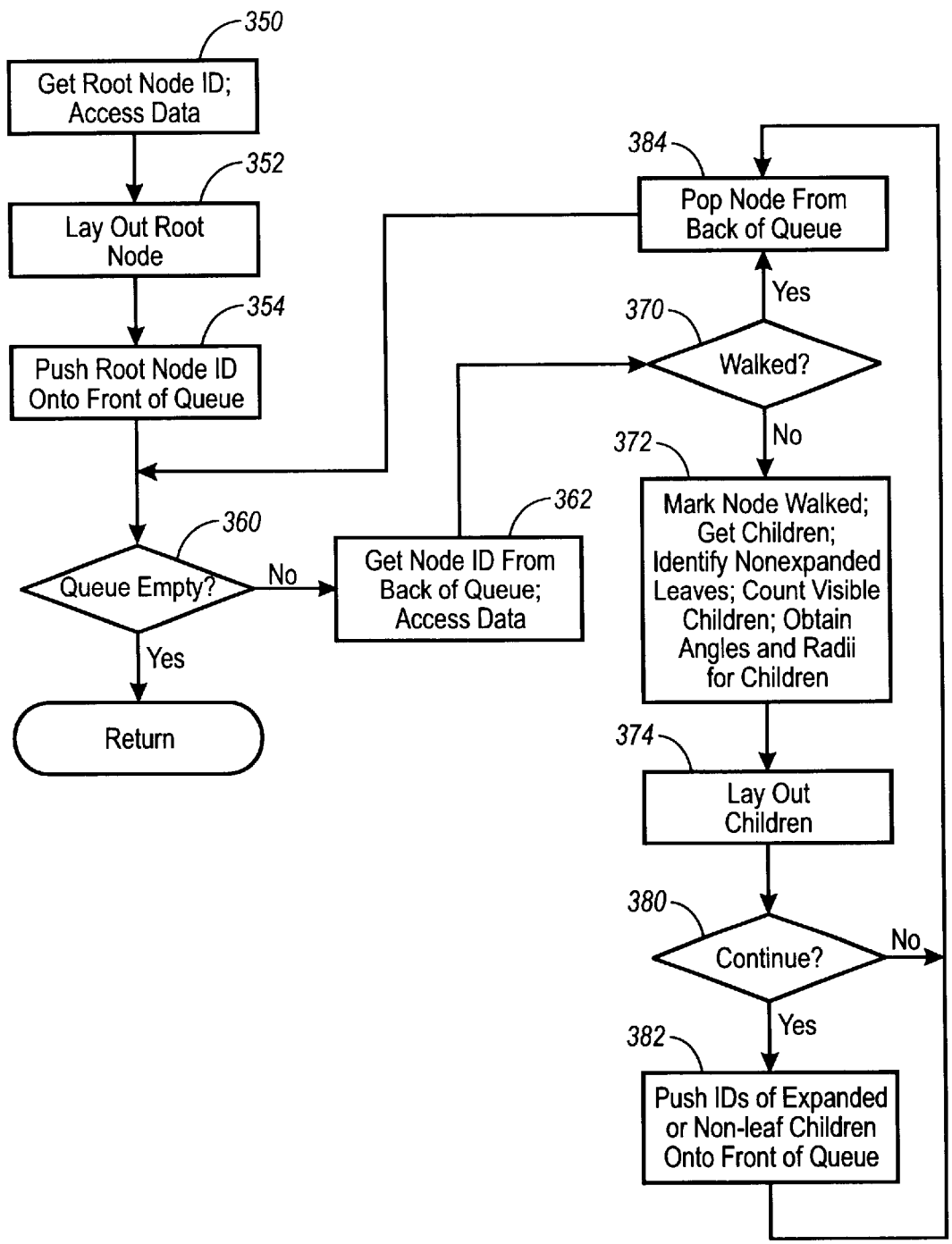
FIG. 7 is a flow chart showing how initial layout can be performed in FIG. 6.
Figure 8:
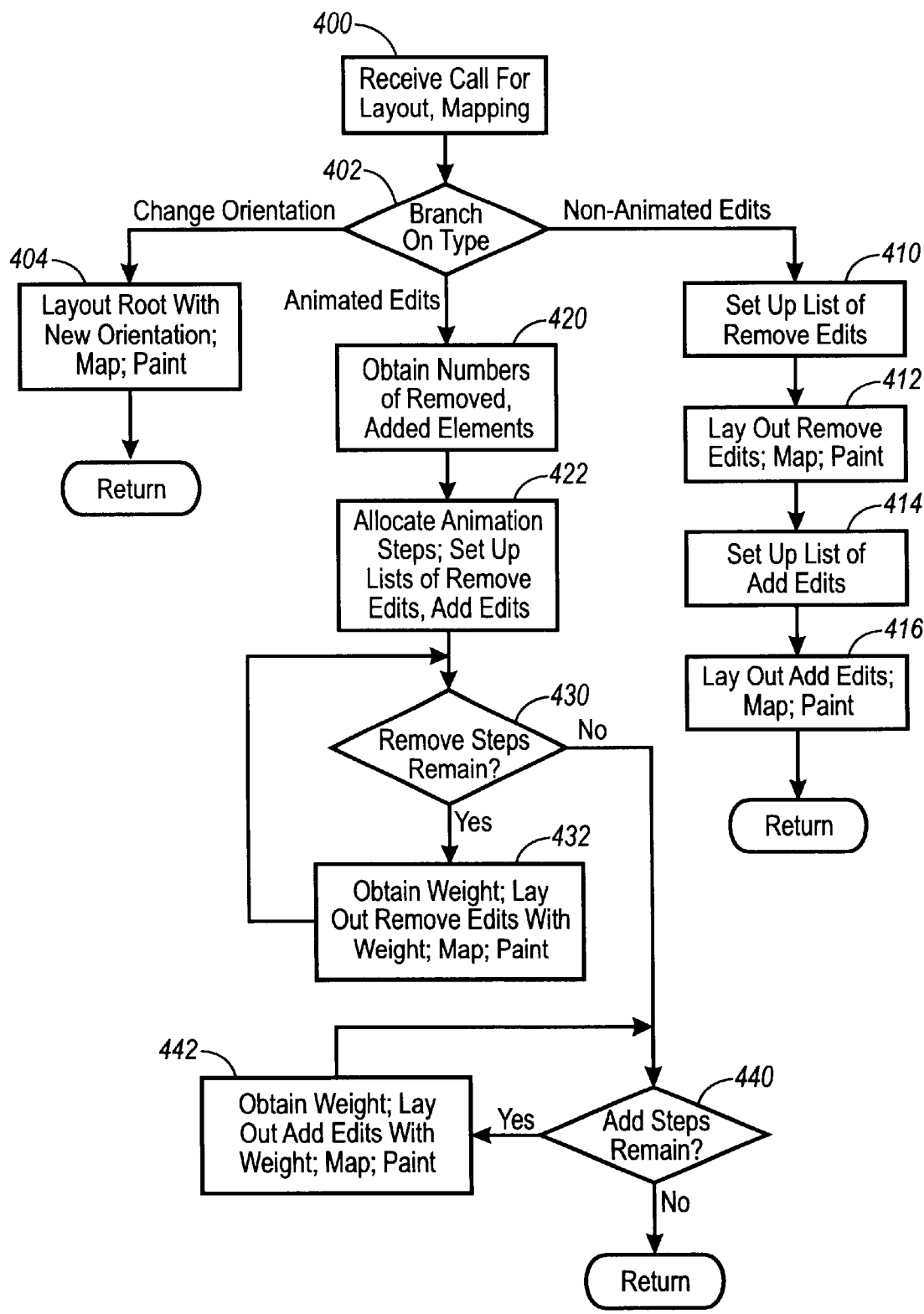
FIG. 8 is a flow chart showing how layout of a changed node-link structure can be performed in FIG. 6.

FIG. 7 shows how layout can be initially performed in box 300 in FIG. 6. FIG. 8 shows how layout of a changed node-link structure can be performed in boxes 312, 324, and 334.

As shown in box 350, walker routines 222 begin initial layout by obtaining the root node ID and using it to access data relating to the root node in directed graph data structure 232. In box 352, walker routines 222 lay out the root node by making a call to math routines 226 with an angle width. This could be any suitable angle that produces a desirable result. The angles $2\pi$ and $\pi/2$ have been successfully used, with $2\pi$ appropriate for a center layout style and with $\pi/2$ appropriate for a top, bottom, right, or left layout style. An interface could also be provided to modify this angle to obtain desirable results.

In response, math routines 226 lay out the root node at the origin of the unit circle, at coordinates (0, 0); with an upward orientation, at coordinates (0, 1); and with an angle half the angle width. Then, walker routines 222 push the root node ID onto the front of a queue in box 354.

In the remainder of FIG. 7, walker routines 222 iteratively traverse a set of elements of the tree defined by directed graph data structure 232, until the queue is empty, as indicated in box 360. Each iteration begins by getting the node ID from the back of the queue and using it to access data relating to the identified node in directed graph data structure 232.

In each iteration, the test in box 370 determines whether the node has already been walked in this traversal. If not, in box 372, walker routines 222 mark the node walked; get the node IDs of the children; identify which of the children are nonexpanded leaves, i.e. leaf nodes with no expanded incoming links; obtain the number of the children that are in the visible tree, as explained below; and call math routines 226 with the number N of children of the node that are in the visible tree to obtain arrays of angles and radii for the children in the visible tree, also explained below.

For the operations in box 372, the number of children in the visible tree N. which is a type of nearby relationship data, can be calculated in either of two ways: If the current traversal is part of a sequence of steps that add nodes, N is equal to the sum of the number of children prior to the traversal plus the number of children being added. If the current traversal is part of a sequence of steps that remove nodes, N is simply equal to the number of children prior to the traversal.

The arrays of angles and radii can be obtained in box 372 in a variety of ways. In one successful implementation, each radius is set to the value 0.7, while each angle is set to the smaller of $((N*\pi)/18)$ and $\pi$. Thus, for N<18, a node's angle will depend on the number of its children that are in the visible tree.

Then, in box 374, walker routines 222 call math routines 226 to lay out the children.

Two general principles of layout are applied in implementing box 374: First, spacing and angle between nodes are determined based only on information about nearby elements in the tree, i.e. nearby relationship data; and, second, the layout information obtained for each node indicates the relative position of a node to its parent in such a way that the position of a node and all its children can be shifted by a small change in the data structure.

A general strategy that can be followed is to start with a child's radius and angle from box 372, obtain approximate distances the child needs, use the approximate distances to obtain a distance from the parent, then use the distance from the parent to obtain more precise distances for the child, and then optionally use the more precise distances to obtain even more precise distances, and so forth.

According to the general strategy, if a child has radius R and angle $\Theta$ from box 372, the approximate distances D1 and D2 can be calculated as sinh(R) and tan(Θ/4), respectively. D1 and D2 can be used to obtain a total distance DT for all the children, where each adjacent pair of children are separated by the greater of the sums of their D1s and D2s, i.e. DT=Σ(max (D1(i) +D1(i+1), D2(i)+D2(i+1))+max(D1 (1), D2(1))+max (D1(N), D2(N)), where the summation runs from i=1 to N−1, with N the number of children for which layout is being performed. If the parent has an available angle ω, the distance DP from the parent can then be calculated as asinh(DT/ω). The children can then be positioned along the circumference of a circle of radius DP centered at the parent with the angles between them proportional to their separations.

DP can then be used to obtain more accurate distances for the children, as follows:

D1'=sinh(DP)asin(sinh(R)/sinh(DP));

D2'=2sinh(DP)atan(tan(Θ/4)/$e^{DP}$).

D1' and D2' can then be used to obtain a more accurate distance DP' to the parent, as above, and so forth until a desired level of precision is reached. At that point, the orientation of each child can be calculated as an angle offset from the orientation of the parent.

Note that the distances described above are expressed in true metrics in the hyperbolic plane. A distance D in the hyperbolic plane corresponds to a vector in the unit circle starting at the origin and going a distance tanh(D/2).

The general strategy thus obtains layout information based only on nearby relationship information about a node, its parent, and its siblings, including information about a sibling's children in the visible tree, as described above in relation to box 372. The general strategy obtains layout information indicating the distance from a child to its parent and an angle representing the difference in orientation between them.

The general strategy has been implemented in software that goes through the children with two iterative loops, but uses the first distance obtained without attempting to obtain more precise distances in the manner described above in relation to the general strategy. The first loop obtains and temporarily saves separations between adjacent children and a "slice size" for each child, and also obtains a total separation. This information is then used to obtain the distance to the parent. The second loop then obtains and saves the relative orientation and area of each child.

In the software implementation, if a child has radius R and angle Θ from box 372, distances D1 and D2 are calculated as set forth above in relation to the general strategy. D1 and D2 for each child are added to D1 and D2 for the previous child to obtain S1 and S2. A total separation ST is increased by the maximum of the child's S1 and S2, except for the first and last children, for which ST is increased by the maximum of the child's D1 and D2.

If the child's S1 is greater than its S2, S1 is saved as the child's separation, D1is initially saved as the size of the child's slice, and, for the second and subsequent children, the previous child's slice size is adjusted to be the minimum of its previous slice size and its S1. Conversely, if the child's S1 is not greater than its S2, S2 is saved as the child's separation, D2 is initially saved as the slice size, and, for the second and subsequent children, the previous child's slice size is adjusted to be the minimum of its previous slice size and its S2. The last child's slice size, however, is adjusted to be the minimum of its previous slice size and the maximum of its D1 and D2, thus completing the first iterative loop.

Using the parent's angle ω, the distance DP from the parent can then be calculated as the greater of tanh(asinh (ST/2ω)/2) or 0.5. DP is saved as part of the data relevant to the parent node.

For each child, the second iterative loop begins by calculating the angle (S/ST)2ω, where S is the saved separation for the child. The angle (S/ST)2ω is added to a running total which began at −2ω. The running total is saved with other data relevant to the child.

Math routines 226 can then calculate a new angle for the child by calling a function similar to the function "insideangle" at columns 67 and 68 of U.S. Pat. No. 5,590,250, incorporated herein by reference. This function, referred to herein as "InsideAngle", starts with a distance ("dist") that has been moved into a wedge and an angle that is half of the wedge. InsideAngle takes as the operative angle the smaller of the starting angle and (π-ε) where ε may have a very small value such as 0.0001, thus avoiding problems in calculation of arctangent. InsideAngle obtains the transformation that would move a point at coordinates (dist, 0) on the unit circle to the origin. InsideAngle then applies this transformation to the complex coordinates of a point at the intersection of the perimeter of the unit circle with the ray starting at the origin whose angle with the horizontal is the operative angle. InsideAngle returns as the resulting angle the angle from the horizontal of the ray from the origin through the transformed point.

To obtain a child's angle, InsideAngle is called with the distance DP and with an angle calculated by multiplying the child's slice size from the first iteration by 2ω/ST. The angle returned by InsideAngle is compared with π/2, and the child's angle is the smaller of the two.

Before saving the child's new angle, math routines 226 save the child's previous angle. If the absolute value of the difference between the old and new angles exceeds a minimum value, math routines 226 also save data indicating that layout should continue, as discussed below.

Finally, the second iterative loop obtains a child's area or side space by calling a function similar to the function "room-available" at columns 67 and 68 of U.S. Pat. No. 5,590,250, incorporated herein by reference. This function, referred to herein as "RoomAvailable", starts with a distance D that has been moved into a wedge and an angle Φ that is half of the wedge. RoomAvailable returns a distance to the edge of the wedge that is calculated by first obtaining the ratio $(1-D^2)/2D$, and by then dividing the ratio by sinΦ to obtain an initial distance S. RoomsAvailable then returns the distance $((S^2-1)^{1/2}-S)$. To obtain a child's area, RoomAvailable is called with the same distance and angle that were used in calling InsideAngle, as described above. The distance returned by RoomAvailable is saved as a measure of the child's area.

Although the software implementation described above can save additional data, it is based on the discovery that only two items of data need to be stored for each node in order to be able to perform layout and mapping as described herein and in relation to FIG. 6 of copending coassigned U.S. patent application Ser. No. 09/124,529, entitled "Mapping a Node-Link Structure to a Rendering Space Beginning from any Node", incorporated herein by reference. One item indicates a distance or position displacement from the node to its children nodes in the hyperbolic plane. The other is an angle displacement in the hyperbolic plane between extension of the incoming link to the node's parent and outgoing link from the parent to the node. These two items of data, or a handle that can be used to access them, can be included in a link's data item in a directed graph data structure as illustrated in FIG. 6 of copending coassigned U.S. patent application Ser. No. 09/124,338, entitled "Node-Link Data Defining a Graph and a Tree Within the Graph", incorporated herein by reference.

The test in box 380 applies an appropriate criterion to determine whether to continue layout to the next generation of nodes. As noted above in relation to box 374, the criterion can be whether any child node's angle has been modified by more than a small angular difference, such as 0.00001. If so, layout should continue.

In box 382, walker routines 222 push the ID of each child node that is expanded or not a leaf onto the front of the queue. Other child nodes could be marked walked in box 382, since they do not have children that will be laid out. When box 382 is completed or if the test in box 380 determines not to continue or the test in box 370 determines that the node is already walked, the back node on the queue is popped, in box 384, before returning to box 360.

FIG. 8 illustrates how layout of a changed node-link structure can be performed in boxes 312, 324, and 334 in FIG. 6. In each case, layout begins in response to a call that leads to layout and mapping, as shown in box 400. As illustrated by the branch in box 402, however, the manner in which layout is performed depends on the type of change being made in the node-link structure.

If the change is a change in orientation of the root node in response to an orientation event, walker routines 222 can call math routines 226 to lay out the root node at the new orientation before mapping and painting, in box 404. The root node can be laid out as described above in relation to box 352 in FIG. 6, but with the new orientation. The new orientation will then be used in mapping, changing the orientation of the representation.

If the change is a non-animated edit, as could occur in response to a stretch event, a drag event, a bookmark event, or a click event if edits are pending, walker routines 222 first set up a list of remove edits, in box 410, and then lay out the remove edits before mapping and painting, in box 412. Then, walker routines 222 set up a list of add edits, in box 414, and then lay out the add edits before mapping and painting, in box 416.

In the current implementation, the lists of edits are set up based on edit source lists that are maintained by various routines in memory 214, including grapher routines 220 and painter routines 224. Also, the current implementation relates to a tree defined by expanded links, as explained in copending coassigned U.S. patent application Ser. No.09/124,338, entitled "Node-Link Data Defining a Graph and a Tree Within the Graph" U.S. Pat. No. 6,108,698, incorporated herein by reference. One pair of edit source lists, designated "CollapsedLinks" and "ExpandedLinks" herein, includes edits for links selected by contract requests and expand requests, respectively, and can therefore be set up in box 330 in FIG. 5. The other pair, designated "RemovedLinks" and "AddedLinks" herein, includes edits for links that are deleted and inserted, respectively. Multiple copies of the edit source lists may exist for different purposes.

The list of remove edits set up in box 410 is based on RemovedLinks, while the list of add edits set up in box 414 is based on AddedLinks. In setting up a list in box 410 or 414, walker routines 222 access each edit in the appropriate edit source list, and use the edit to obtain appropriate entries for the list being set up. In each case, an edit in the edit source list is used to obtain a node ID of the child node of the edit's link and an edit identifier indicating the type of edit being performed.

A parent of the child node is added to the back of a list of affected nodes unless it is already on the list. The parent is the child node's expanded parent node or, if none of its parent nodes are currently expanded, its first parent node. If an edit from an edit source list relates to a child node that does not have a parent, it must relate to the root, and the root node is therefore put on the back of the list of affected nodes in that case.

At the end of the iteration for a link from a source edit list, the link's child node is also added to a list of children nodes before accessing the next edit in the appropriate edit source list for use in the next iteration. In this way, an iteration is performed for each edit on the edit source list until all edits have been handled to complete the lists of affected nodes and children nodes.

Then, in box 412 or 416, the edits are laid out using the lists, following a sequence similar to that in boxes 354 through 382 of FIG. 7 for each node in the list of affected nodes, pushing the node from the list rather than the root node onto the front of the queue and making several changes in box 372 as follows: In addition to identifying which children are nonexpanded leaves, layout in boxes 412 and 416 determines whether each child is on the list of children nodes. If so, layout multiplies the angle and radius for the child by a weight. In box 412, the weight is zero, so that the child is laid out in box 374 at approximately its previous position with an angle and radius of zero, and thus disappears. In box 416, the weight is one, so that the child is laid out in box 374 at its new position with its full angle and radius.

The operations in boxes 410 through 416 could also be implemented within an animation sequence, in which case remove edits could be handled during an initial part of the animation sequence and add edits could be handled during a subsequent part of the sequence. If on the other hand the nonanimated edits result primarily from node creation during painting, as described above in relation to FIG. 6, the edits may only be add edits, and all currently pending edits could be handled in each step of the animation sequence.

If the change is an animated edit, as could occur in response to an insert/delete event such as a request to contract or expand an element or in response to a request to animate a number of separate changes requested by such events, walker routines 222 first obtain the numbers of elements to be removed and added based on the source edit lists, in box 420. The number to be removed can be obtained by adding the numbers of elements in CollapsedLinks and RemovedLinks, while the number to be add e d can be obtained by adding the numbers of elements in ExpandedLinks and AddedLinks. Then, in box 422, walker routines 222 allocate the available animation steps between removing steps and adding steps, and also set up lists of remove edits and add edits, somewhat as in boxes 410 and 414 in FIG. 8. A simple allocation of animation steps is half removing steps and half adding steps, but if there are no elements to be removed, all the steps can be adding steps, and vice versa if no elements to be added.

In setting up lists of remove edits and add edits in box 422, walker routines 222 can perform as described above in relation to boxes 410 and 414 unless there are collapsed or expanded nodes. In the case of collapsed or expanded nodes, the node itself, in addition to its parent, is pushed onto the back of the list of affected nodes; then, the children of the node, rather than the node itself, are added to the list of children nodes. In other words, collapsing or expanding can be thought of as affecting two generations of nodes, unlike other operations that only affect one. Walker routines 222 set up two pairs of lists of affected and children nodes, one pair for remove edits and one for add edits.

The animation steps that remove nodes are then performed in the loop that begins with box 430, with a weight being obtained, with the remove edits being laid out with the weight, and with mapping and painting of an animation frame, in box 432. Similarly, the animation steps that add nodes are then performed in the loop that begins with box 440, with a weight being obtained, with the add edits being laid out with the weight, and with mapping and painting of an animation frame, in box 442. By removing nodes before adding nodes, the situation is prevented where the same node would appear in two places in a single frame. By performing a final step with the weight zero after removing nodes and another with the weight one after adding nodes, the technique can ensure that the final weight is zero or one, respectively.

A weight can be obtained in box 432 by subtracting the current remove animation step number from the number of remove animation steps, then dividing the difference by the number of remove animation steps, so that the weights go from one to zero during a series of remove animation steps. Similarly, a weight can be obtained in box 442 by adding one to the current add animation step number, then dividing the sum by the number of add animation steps, so that the weights go from approximately zero to one during a series of add animation steps.

The total number of animation steps, coupled with the animation speed, helps influence the perception of object constancy during animation. As can be understood from the above description of how the weights are obtained, the total number of animation steps determines the rate at which a removed or added element's area changes, thus indirectly determining the rate at which other elements must move in relation to the area of the removed or added element. A larger number of animation steps, appropriately allocated between removing steps and adding steps, is more likely to produce object constancy, provided a sufficient animation speed is maintained.

The technique of FIG. 8, when performed with an appropriate number of animation steps and at an appropriate speed, has successfully produced the perception of a set of nodes contracting and expanding somewhat like a fan would be folded and unfolded. By adjusting the radii and angles that are assigned to the nodes, different perceptions can be obtained, such as that deleted nodes are drawn into their parent or are squeezed off to infinity or that inserted nodes grow out of their parent or are pulled in from infinity. When only one of a group of children is deleted, it can appear to be squeezed off to infinity, but if all of the children are deleted as a group, as in contraction, all can appear to be drawn into their parent. Similarly, when one child is added to a group, it can appear to be pulled in from infinity, but if all of the children are inserted as a group, as in expansion, all can appear to grow out of their parent. Further, grandchildren can be squeezed off to infinity while children are drawn into their parent, with the rates adjusted so that the grandchildren appear stable and only the children appear to move.

As noted above, two or more separate changes indicated in the edit lists can be animated concurrently. In addition, an interface can be provided through which client 212 can request that two or more separate changes can be made without animation. In other words, the edit lists can continue to be formed until a command is received that requires that the edits be committed. The command can require that the edits be committed with animation as described above or without animation as in a refresh operation. When the edits are committed, the edit lists can be cleared.

In order to facilitate animation, additional expansion/contraction information can be maintained, as described in relation to FIG. 6 of copending coassigned U.S. patent application Ser. No. 09/124,338, entitled "Node-Link Data Defining a Graph and a Tree Within the Graph" U.S. Pat. No. 6,108,698, incorporated herein by reference. The additional flags described there make it possible to quickly switch between representations of the previous structure and the modified structure, buy allowing rapid decisions about which elements should be traversed for each representation.

C.4. Examples

Figure 9:
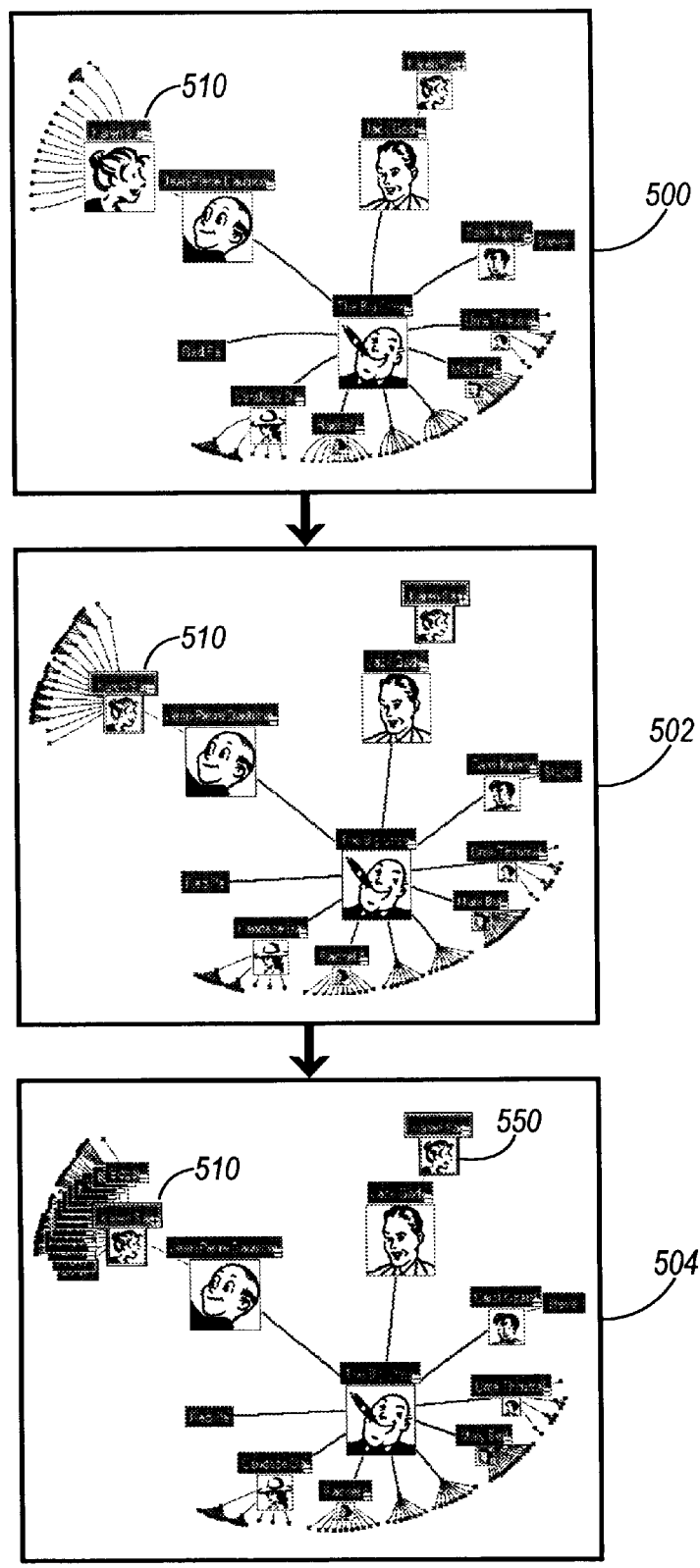
FIGS. 9 and 10 show two sequences of images that can be produced by the technique of FIG. 8.
Figure 10:
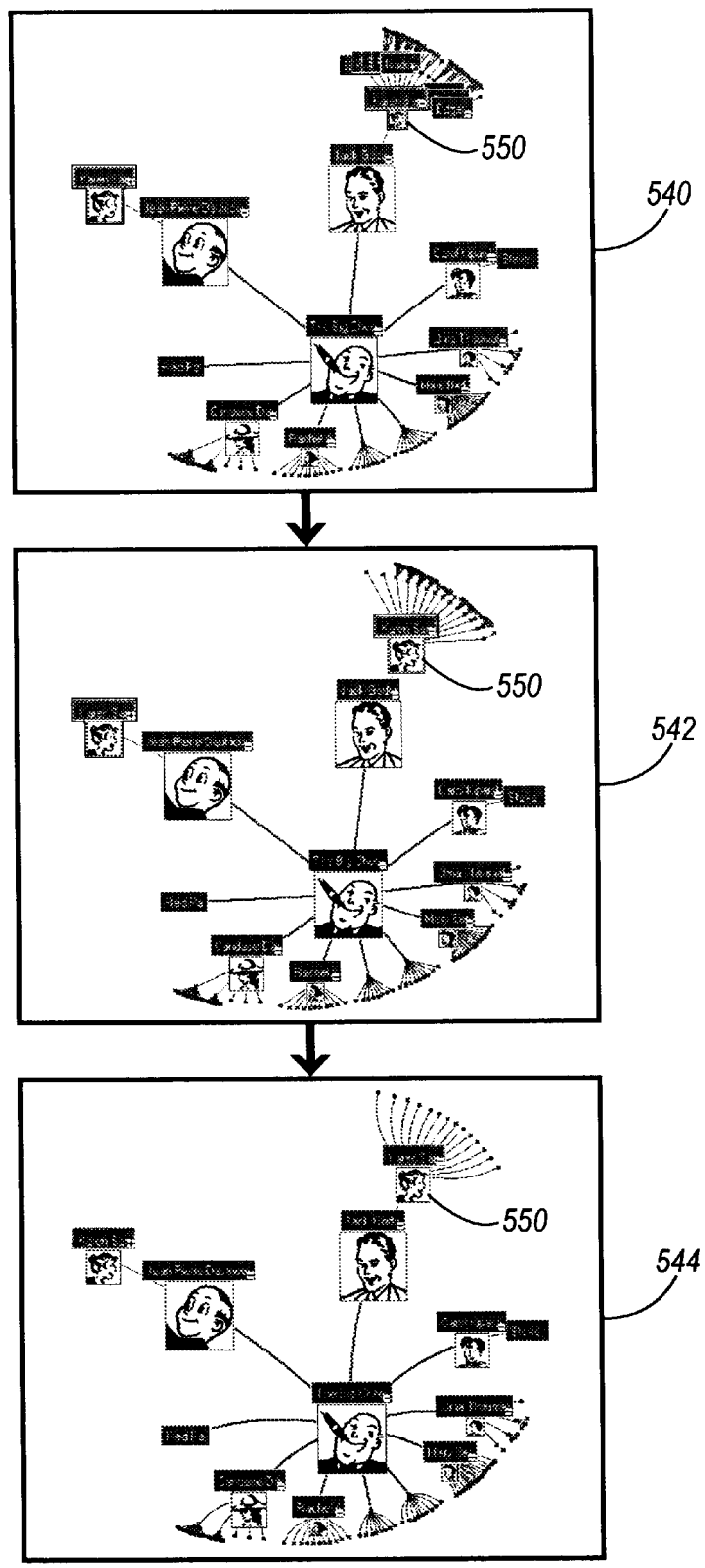

FIGS. 9 and 10 illustrate exemplary sequences of representations of node-link structures like those presented by a current software implementation, which is substantially the same as described above in relation to FIGS. 4–8. The illustrated representations show an organization chart, resembling in some ways the representations in FIGS. 17–21 of U.S. Pat. No. 5,619,632, incorporated herein by reference.

FIG. 9 shows a sequence of representations that could result from a request to contract a node feature, while FIG. 10 shows a sequence that could result from a request to expand a node feature. Also, the concatenated sequence from FIG. 9 through FIG. 10 could result from a request to expand a clone of a previously expanded node feature, as explained below.

Representations 500, 502, and 504 in FIG. 9 include node features that represent individuals within the organization chart. Each node feature, when presented at maximum size, includes a graphical representation of a person's face and a rectangular title block with a name or nickname of the person. In the lower right-hand corner of the rectangular title block for a node that has descendants can be a small "+" or "−" for requesting expansion or contraction of the node feature, respectively. These little symbols can make a transition at an appropriate time after being selected, such as in the first animation frame. When node features are presented at less than maximum size, the graphical representation can have a reduced size, and the title block can be shortened. As it approaches the perimeter of the representation, a node feature can become a small dot, and then it can become invisible.

Node feature 510 is present in each of representations 500, 502, and 504, and is shown expanded in representation 500, with its children small dots near the perimeter. The sequence in FIG. 9 could result, for example, from a request to contract node feature 510. In response to this request, the children and grandchildren of the node represented by node feature 510 are removed from the node-link structure, and the transition from representation 500 to a representation in which they are absent is animated. Representations 502 and 504 are two intermediate representations that could be presented in such an animated sequence.

In representation 502, its children have just begun to be drawn toward node feature 510. Its grandchildren, however, remain in position, because they are spreading away from the children at a rate that counterbalances the rate at which the children are drawn toward node feature 510.

In representation 504, the children have been drawn even closer toward node feature 510, while the grandchildren continue to remain in position. In addition, because the children have moved away from the perimeter of the representation, they have sufficient area that each child's rectangular title block can be presented. The title blocks overlap based on the order in which they are painted, producing the perception of a set of fanned out cards or sheets.

The paths followed by the children of node feature 510 are non-parallel, because all of them converge on node feature 510. As they approach node feature 510, the area of node feature 510 reduces, resulting in a temporary reduction in size of the graphical representation of a person's face.

Representation 504 is followed, possibly after a few more intermediate representations, by a last representation in which none of the children or grandchildren of node feature 510 are shown. This appearance can be understood from representation 540 in FIG. 10, in which node feature 510 appears as it would in the last representation.

In FIG. 10, representations 540, 542, and 544 each include node feature 550, which was shown contracted in representation 504 in FIG. 9 but is shown expanded in representation 544 in FIG. 10, with its children small dots near the perimeter. The sequence in FIG. 10 could result, for example, from a request to expand node feature 550 when it appears as in representation 504. In response to this request, the children and grandchildren of the node represented by node feature 510 are added to the node-link structure, and the transition from representation 504 to a representation in which they are presented is animated. Representations 540 and 542 are two intermediate representations that could be presented in such an animated sequence, and representation 544 is a last representation.

In representation 540, its children have just begun to spread from node feature 550. Because the children are still a distance away from the perimeter of the representation, they have sufficient area that each child's rectangular title block can be presented. As in representation 504 in FIG. 8, the title blocks overlap, producing the perception of a set of fanned out cards or sheets. Its grandchildren, however, are already in position, because they are being drawn toward the children from infinity at a rate that counterbalances the rate at which the children are spreading from node feature 510.

In representation 542, the children have spread further away from node feature 550, while the grandchildren continue to remain in position. In addition, because the children have moved closer to the perimeter of the representation, they do not have sufficient area for presentation of title blocks, and have become small dots.

Finally, in representation 544, the children of node feature 550 have reached their positions near the perimeter of the representation. Due to nearness to the perimeter, the grandchildren are not visible.

The paths followed by the children of node feature 550 are non-parallel, because all of them diverge from node feature 550. When they initially appear, in representation 540, they are close to node feature 550, so that the area of node feature 550 is reduced, resulting in a temporary reduction in size of the graphical representation of a person's face. As they diverge from node feature 550, the area of node feature 550 increases.

As mentioned above, the sequences in FIGS. 9 and 10 could be concatenated to produce a single sequence in which node feature 510 is first contracted and node feature 550 is then expanded. This could occur, for example, where node features 510 and 550 both represent the same node in a graph, but the node has two incoming links, so that the node is cloned, occurring twice in a tree that is represented in FIGS. 9 and 10. As explained in relation to FIG. 10 of copending coassigned U.S. patent application Ser. No. 09/124,338, entitled "Node-Link Data Defining a Graph and a Tree Within the Graph" U.S. Pat. No. 6,108,698, incorporated herein by reference, when a user requests expansion of the node feature representing one clone, the response can include contracting the node feature representing another clone that was previously expanded. In effect, the branch is moved from node 510 to node 550. The symbols "+" and "−" in the two node features would be modified appropriately.

C.5. Variations

The implementation described above could be varied in many ways within the scope of the invention.

An implementation similar to that described above has been successfully executed on processors of IBM compatible PCs, but implementations could be executed on other machines with any appropriate processors.

An implementation similar to that described above has been successfully executed using C++ in 32-bit Windows environments, but other programming languages and environments could be used, including non-object-oriented environments, and other platforms could be used, such as Lisp, a Unix environment, ANSI C, Pascal, and so forth.

An implementation similar to that described above has been successfully executed with node-link data presented in an XML-compliant format and in an experimental format, but the invention could be implemented with any suitable type of node-link data, whether static or dynamic, and accessible in any appropriate way, such as in memory or over a network.

An implementation similar to that described above has been implemented with each iteration preparing and presenting one representation or an animated series of representations of a graph in response to a navigation signal, but the invention could be implemented with other types of iterations invoked by other types of signals or calls.

An implementation similar to that described above has been successfully executed with navigation signals received from a keyboard and mouse and relating to a displayed representation or animated series of representations of a node-link structure. The invention could, however, be implemented with or without navigation signals; for example, elements could be moved around in response to different sortings of the children of a node or in response to the application of different filters to elements of a structure. Also, the invention could be implemented with any appropriate type of expand and contract signals or other navigation signals, including signals resulting from external queries, selection of a menu entry-like item requesting expansion below an indicated node or link, or selection of a menu entry-like item requesting expansion below the current focus. The navigation signals could instead relate to an illusory space like those produced by videogames or virtual reality environments or a presentation space other than a display and navigation signals could instead be produced by any appropriate user input device, including other kinds of pointing devices and other kinds of devices for receiving alphanumeric or linguistic input such as voice, gestures, or other modes of user input. The invention could be implemented with any appropriate animation techniques.

The implementation described above presents representations of node-link structures in which nodes are represented by features such as circles, rectangles, icon-like images, and so forth, and in which links are represented by lines connecting node features. The invention could, however, be implemented with any other appropriate way of representing a node-link structure, including, at least for some aspects of the invention, implementation in a representation that includes a list of a hierarchy of items, with the children of an item indented below it.

The implementation described above maintains object constancy for features representing shared nodes and links through a sequence of steps by presenting similar features at sufficiently small intervals in time and space, but the invention could be implemented with other techniques for maintaining object constancy and with object constancy for features representing only shared nodes or only shared links. For example, other cues could be used to help provide object constancy of a moving element, such as blurring between positions, a sequence of outlines between positions, or other indicators of motion between positions.

In the implementation described above, the area for a feature representing a deleted or inserted element decreases or increases while the areas of nearby elements increase or decrease, respectively. The invention could, however, be implemented with other techniques for changing features representing deleted and inserted elements, such as moving features in from or out to the periphery, changing color to show deletion and insertion, fading in or out, or any other conventional animation techniques, including those available in Microsoft PowerPoint. Further, the invention could be implemented with techniques that increase or decrease areas other than those of nearby elements. Further, a deletion might occur immediately, without animation, at the beginning of the animation of compensating movements of nearby elements could then be animated; similarly, an insertion might occur without animation at the end of animation of compensating movements of nearby elements.

In the implementation described above, a set of elements is deleted, then a set of elements is inserted, and movement of an element is accomplished by first deleting it from its previous position and by then inserting it at its new position. The invention could, however, be implemented with techniques that concurrently delete and insert elements, and, further, the invention could be implemented with techniques that move an element in ways other than by deleting it and then inserting it.

The implementation described above obtains layout data in the manner described in copending coassigned U.S. patent application Ser. No. 09/124,805, entitled "Local Relative Layout of Node-Link Structures in Space with Negative Curvature", incorporated herein by reference, but the invention could be implemented with or without layout as such, or by obtaining layout data in other ways, such as by laying out the entire node-link structure separately for each representation or by laying out the node-link structure in other ways.

In the implementation described above, a node-link structure is mapped into the unit disk and then painted in accordance with copending coassigned U.S. patent application Ser. No. 09/124,529, entitled "Mapping a Node-Link Structure to a Rendering Space Beginning from any Node", incorporated herein by reference, but the invention could be implemented with or without mapping, or with a node-link structure mapped and presented in any other appropriate way, including mapping it into any other appropriate rendering space and presenting it in any other appropriate display space, including three-dimensional rendering and display spaces.

The implementation described above is suitable for presenting representations of trees. The invention could be used to present representations of other types of node-link structures, such as graphs in general.

The implementation described above uses node-link data that include expansion flags of links to define a tree within a graph as disclosed in copending coassigned U.S. patent application Ser. No. 09/124,338, entitled "Node-Link Data Defining a Graph and a Tree Within the Graph", with memory management as disclosed in copending coassigned U.S. patent application Ser. No. 09/124,474, entitled "Controlling Which Part of Data Defining a Node-Link Structure is in Memory", both incorporated herein by reference, but the invention could be implemented with a node-link structure defined in any other appropriate way, and loaded into memory in any appropriate way.

The implementation described above can handle directed graphs, including cyclic directed graphs, but the invention could be implemented for other types of graphs by converting other types of links to appropriate combinations of directed links or by otherwise providing a protocol for mapping the structure of a graph to a tree. For example, an undirected link between two nodes could be converted to a pair of directed links between the same nodes or could be assigned a direction based on an appropriate criterion. In general, a representation in which all undirected links have been converted to a pair of directed links is likely to be visually confusing, because each pair of directed links results in a cycle, but this confusing might be overcome by presenting cycles in another way.

In the implementation described above, acts are performed in an order that could in many cases be modified. For example, a depth-first walk rather than a breadth-first walk could be performed in FIG. 6.

Also, in the implementation described above, several software portions are distinguished, such as grapher, walker, painter, and math routines and the client, but the invention could be implemented with other combinations of hardware and software and with software organized in any appropriate way.

D. Applications

The invention has been applied in providing an interactive browser of node-link structures. The invention could be applied in a variety of contexts in which node-link structures are visualized. In particular, the invention could be applied in visualizing web-related structures such as the structure formed by a cached set of web pages or other web objects.

More generally, the invention could be applied to provide a browser for organization charts, file system hierarchies, hypertext hierarchies, world wide web connectivity structures, parts breakdowns, SGML structures, or any other large node-link structures. The browser could be used in editing structures or their contents.

E. Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of presenting node-link representations on a display; the method comprising:

accepting signals indicating edits to a first node-link structure, including change data indicating requested changes to the first node-link structure;

accumulating a list of edits of the first node-link structure in response to said signals, edits in the list of edits corresponding to the change data; and a sequence of steps including a first step, a last step, and at least one intermediate step;

the first step presenting a first representation that represents the first node-link structure;

the last step presenting a last representation that represents a second node-link structure that is a modified version of the first node-link structure according to a plurality of edits in the list of edits, with at least one insertion and at least one deletion in the first node-link structure; the first and second node-link structures both including a set of shared elements, the shared elements including a plurality of moving elements that are represented by features that have different positions in the first and last representations;

each intermediate step presenting an intermediate representation that includes features representing a subset of the shared elements that includes at least one of the plurality of moving elements, each of the subset also being represented by features in both the first and last representations;

features representing the plurality of moving elements having object constancy through the sequence of steps.

2. A method according to claim 1 in which the plurality of moving elements include a first moving element and a second moving element; the second moving element being represented by features that have different positions in the first and last representations; the feature representing the second moving element having object constancy through the sequence of steps; each of the first and second moving elements appearing to follow a respective path from its position in the first representation to its position in the last representation; the paths of the first and second moving elements not being parallel straight lines.

3. A method according to claim 1, further comprising, prior to the sequence of steps:

receiving signals requesting at least two separate changes in the first node-link structure;

based on the signals, obtaining change data indicating the requested changes in the first node-link structure; and after the signals are received, adding the change data to the edit list, and using the change data and a first data structure defining the first node-link structure to obtain a second data structure defining the second node-link structure, the second node-link structure being a version of the first node-link structure in which the requested changes have been performed.

4. A method according to claim 1, further comprising:

modifying a first data structure defining the first node-link structure to obtain a second data structure defining the second node-link structure;

the first step comprising accessing the first data structure before it is modified;

the last step comprising accessing the second data structure.

5. A method according to claim 4 in which each feature representing an element has an area and in which the act of modifying the first data structure includes deleting an element of the first node-link structure; the area of the feature representing the deleted element decreasing through the sequence of steps; the areas of nearby features increasing through the sequence of steps.

6. A method according to claim 4 in which each feature representing an element has an area and in which the act of modifying the first data structure includes inserting an element into the first node-link structure; the area of the feature representing the inserted element increasing through the sequence of steps; the areas of nearby features decreasing through the sequence of steps.

7. A method according to claim 1 in which the shared elements include a first element that has descendants; the first element being contracted in the first node-link structure and expanded in the second node-link structure.

8. A method according to claim 1 in which the shared elements include a first element that has descendants; the first element being expanded in the first node-link structure and contracted in the second node-link structure.

9. A method according to claim 1 in which the sequence of steps includes a first subsequence and a second subsequence; a first set of features representing elements being deleted during the first subsequence and a second set of features representing elements being inserted during the second subsequence.

10. A method according to claim 9 in which the first and second set of features represent the same elements.

11. The method of claim 1, including accepting said signals indicating edits from a plurality of edit sources.

12. A system comprising:

a display; and a processor for presenting node-link representations on the display; the processor, in presenting the node-link representations, accepting signals indicating edits to a first node-link structure, including change data indicating requested changes to the first node-link structure, accumulating a list of edits of the first node-link structure in response to said signals, edits in the list of edits corresponding to the change data; and performing a sequence of steps including a first step, a last step, and at least one intermediate step;

in the first step, the processor presenting a first representation that represents the first node-link structure;

in the last step, the processor presenting a last representation that represents a second node-link structure that is a modified version of the first node-link structure according to a plurality of edits in the list of edits, with at least one insertion and at least one deletion in the first node-link structure; the first and second node-link structures both including a set of shared elements, the shared elements including a plurality of moving elements that are represented by features that have different positions in the first and last representations;

in each intermediate step, the processor presenting an intermediate representation that includes features representing a subset of the shared elements that includes at least one of the plurality of moving elements, each of the subset also being represented by features in both the first and last representations;

features representing the plurality of moving elements having object constancy through the sequence of steps.

13. The system of claim 12, wherein the processor accepts said signals indicating edits from a plurality of edit sources.

14. An article of manufacture for use in a system that includes:

a display;

data storage access resources; and a processor connected for presenting images on the display and for receiving data accessed on a storage medium by the storage medium access device; the article of manufacture comprising:

data storage;

a list of edits of a first node-link structure stored in the data storage, edits in the list of edits readable by the processor and corresponding to change data indicating requested changes to the first node-link structure; and instruction data stored in the data storage; the instruction data indicating instructions the processor can execute; the processor, in executing the instructions, presenting node-link representations on the display; the processor, in presenting the node-link representations, performing a sequence of steps including a first step, a last step, and at least one intermediate step;

in the first step, the processor presenting a first representation that represents the first node-link structure;

in the last step, the processor presenting a last representation that represents a second node-link structure that is a modified version of the first node-link structure according to a plurality of edits in the list of edits, with at least one insertion and at least one deletion in the first node-link structure; the first and second node-link structures both including a set of shared elements, the shared elements including a plurality of moving elements that are represented by features that have different positions in the first and last representations;

in each intermediate step, the processor presenting an intermediate representation that includes features representing a subset of the shared elements that includes at least one of the moving elements, each of the subset also being represented by features in both the first and last representations;

features representing the plurality of moving elements having object constancy through the sequence of steps.

15. The article of claim 14, wherein the edits in the list of edits arise from a plurality of edit sources.

16. A method of transferring data between first and second machines over a network, the second machine including a display, memory, and a processor connected for presenting images on the display and for accessing the memory; the memory being for storing instruction data; the method comprising:

establishing a connection between the first and second machines over the network; and operating the first and second machines to transfer instruction data from the first machine to the memory of the second machine; the instruction data indicating instructions the processor can execute; the processor, in executing the instructions, presenting node-link representations on the display; the processor, in presenting the node-link representations, accepting signals indicating edits to a first node-link structure, including change data indicating requested changes to the first node-link structure, accumulating a list of edits of the first node-link structure in response to said signals, edits in the list of edits corresponding to the change data; and performing a sequence of steps including a first step, a last step, and at least one intermediate step;

in the first step, the processor presenting a first representation that represents the first node-link structure;

in the last step, the processor presenting a last representation that represents a second node-link structure that is a modified version of the first node-link structure according to a plurality of edits in the list of edits, with at least one insertion and at least one deletion in the first node-link structure; the first and second node-link structures both including a set of shared elements, the shared elements including a plurality of moving elements that are represented by features that have different positions in the first and last representations;

in each intermediate step, the processor presenting an intermediate representation that includes features representing a subset of the shared elements that includes the at least one of the moving elements, each of the subset also being represented by features in both the first and last representations;

features representing the plurality of moving elements having object constancy through the sequence of steps.

17. The method of claim 16, including accepting said signals indicating edits from a plurality of edit sources.

18. A method of presenting node-link representations on a display; the method comprising:

accepting signals indicating edits to a first node-link structure, including change data indicating requested changes to the first node-link structure;

accumulating a list of edits of the first node-link structure in response to said signals, edits in the list of edits corresponding to the change data; and a sequence of steps including a first step, a last step, and at least one intermediate step;

the first step presenting a first representation that represents the first node-link structure;

the last step presenting a last representation that represents a second node-link structure that is a modified version of the first node-link structure according to a plurality of edits in the list of edits, with at least one insertion and at least one deletion in the first node-link structure; the first and second node-link structures both including a set of shared elements, the shared elements including first and second moving elements that are each represented by features that have different positions in the first and last representations; =p1 each intermediate step presenting an intermediate representation that includes features representing a subset of the shared elements that includes the first and second moving elements, each of the subset also being represented by features in both the first and last representations;

the feature representing the first moving element having object constancy through the sequence of steps; the feature representing the second moving element having object constancy through the sequence of steps; each of the first and second moving elements appearing to follow a respective path from its position in the first representation to its position in the last representation; the paths of the first and second moving elements not being parallel straight lines.

19. The method of claim 18, including accepting said signals indicating edits from a plurality of edit sources.

20. A method of presenting node-link representations on a display; the method comprising:

receiving signals from a plurality of sources of edits, requesting at least two separate changes in a first node-link structure;

based on the signals, obtaining change data indicating the requested changes in the first node-link structure, the requested changes including at least one insertion and at least one deletion in the first node-link structure;

after the signals are received, using the change data and a first data structure defining the first node-link structure to obtain a second data structure defining a second node-link structure, the second node-link structure being a version of the first node-link structure in which the requested changes have been performed; and performing a sequence of steps including a first step, a last step, and at least one intermediate step;

the first step presenting a first representation that represents the first node-link structure;

the last step presenting a last representation that represents the second node link structure; the first and second node-link structures both including a set of shared elements, the shared elements including a moving element that is represented by features that have different positions in the first and last representations;

each intermediate step presenting an intermediate representation that includes features representing a subset of the shared elements that includes the moving element, each of the subset also being represented by features in both the first and last representations;

the feature representing the moving element having object constancy through the sequence of steps.

* * * * *